(12) United States Patent
Shirahata

(10) Patent No.: US 11,610,135 B2
(45) Date of Patent: Mar. 21, 2023

(54) INFORMATION PROCESSING APPARATUS, INFORMATION PROCESSING METHOD, AND NON-TRANSITORY COMPUTER-READABLE STORAGE MEDIUM FOR STORING PROGRAM

(71) Applicant: FUJITSU LIMITED, Kawasaki (JP)

(72) Inventor: Koichi Shirahata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 694 days.

(21) Appl. No.: 16/687,076

(22) Filed: Nov. 18, 2019

(65) Prior Publication Data
US 2020/0202222 A1 Jun. 25, 2020

(30) Foreign Application Priority Data

Dec. 25, 2018 (JP) .............................. JP2018-241137

(51) Int. Cl.
*G06N 3/10* (2006.01)
*G06N 3/08* (2006.01)
*G06N 3/04* (2006.01)

(52) U.S. Cl.
CPC ................. *G06N 3/10* (2013.01); *G06N 3/04* (2013.01); *G06N 3/08* (2013.01)

(58) Field of Classification Search
CPC .............. G06N 3/10; G06N 3/04; G06N 3/08
See application file for complete search history.

(56) References Cited

U.S. PATENT DOCUMENTS

2010/0214936 A1 8/2010 Ito et al.
2017/0228634 A1 8/2017 Tomita

FOREIGN PATENT DOCUMENTS

| JP | 2009-80693 A | 4/2009 |
|---|---|---|
| JP | 2017-138867 A | 8/2017 |
| WO | WO2009/041350 A1 | 4/2009 |

OTHER PUBLICATIONS

Chen, Tianqi, et al. "Training deep nets with sublinear memory cost." arXiv preprint arXiv:1604.06174 (2016). (Year: 2016).*
Jin, Hai, et al. "Layer-centric memory reuse and data migration for extreme-scale deep learning on many-core architectures." ACM Transactions on Architecture and Code Optimization (TACO) 15.3 (2018): 1-26. (Year: 2018).*

(Continued)

*Primary Examiner* — Eric Nilsson
(74) *Attorney, Agent, or Firm* — Fujitsu Patent Center

(57) ABSTRACT

An information processing method includes: deciding a timing when transfer to a memory is completed in a total time that is a sum of a calculation time at one or plurality of second layers at which calculation is carried out earlier than a first layer regarding a timing when data relating to calculation of the first layer is stored in the memory based on a calculation time estimated in advance regarding each of one layer or a given number of layers in a plurality of layers included in a neural network and a time of transfer of data relating to calculation of each of the one layer or the given number of layers to the memory; and storing the data relating to calculation of the first layer in the memory based on the decided timing in sequentially carrying out calculation of each layer of the neural network.

7 Claims, 16 Drawing Sheets

(56) References Cited

OTHER PUBLICATIONS

Zhang, Chen, et al. "Optimizing FPGA-based accelerator design for deep convolutional neural networks." Proceedings of the 2015 ACM/SIGDA international symposium on field-programmable gate arrays. 2015. (Year: 2015).*

Rhu, Minsoo et al., "vDNN: Virtualized Deep Neural Networks for Scalable, Memory-Efficient Neural Network Design", The 49th Annual IEEE/ACM International Symposium on Microarchitecture (MICRO-49), 13 pages, 2016.

Chen, Tianqi et al., "Training Deep Nets with Sublinear Memory Cost", arXiv preprint arXiv:1604.06174, pp. 1-12, 2016.

Han, Song et al., "Deep Compression: Compressing Deep Neural Networks with Pruning, Trained Quantization and Huffman Coding", Published as a conference paper at ICLR 2016, arXiv preprint arXiv:1510.00149, pp. 1-14, 2015.

\* cited by examiner

| i | m[ms] | c[ms] |
|---|---|---|
| Conv1 | 0.252902385 | (0.189873) |
| Pool1 | 0.066188471 | 0.100911 |
| Conv2 | 0.072777023 | 0.564037 |
| Pool2 | 0.019494736 | 0.04384 |
| FC1 | 0.013355593 | 0.132193 |
| FC2 | 0.004362645 | 0.01661 |
| Softmax | (0.004362645) | 0.052719 |

INFORMATION PROCESSING APPARATUS, INFORMATION PROCESSING METHOD, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-241137, filed on Dec. 25, 2018, the entire contents of which are incorporated herein by reference.

FIELD

The embodiment discussed herein is related to an information processing apparatus, an information processing method, and a non-transitory computer-readable storage medium for storing a program.

BACKGROUND

In recent years, machine learning using a neural network of a multilayer structure has been attracting attention. Such machine learning using a neural network of a multilayer structure is referred to also as deep learning. In the deep learning, increase in the number of hierarchical layers of the neural network is being promoted, and effectiveness thereof has been confirmed in many fields. For example, the deep learning has exerted high recognition accuracy comparable to that of the human in recognition of image and sound.

In the deep learning, the amount of calculation is enormous and therefore speed enhancement by an accelerator is carried out. There is a limit to the memory capacity on the accelerator and this memory capacity is at most approximately 16 gigabytes (GB), for example, compared with a host memory with several terabytes (TB). For this reason, a memory region that is not being used at a certain calculation timing is saved from the accelerator to the host side. Then, at the time of start of calculation of each layer of the neural network, neuron data of another layer is transferred between the host and the accelerator and is read in again. Thereby, the memory usage in the accelerator is reduced.

Examples of the related art are disclosed in Japanese Laid-open Patent Publication No. 2017-138867 and Japanese Laid-open Patent Publication No. 2009-80693.

Other examples of the related art are disclosed in Minsoo Rhu, et al. "vDNN: Virtualized deep neural networks for scalable, memory-efficient neutral network design." The 49th Annual IEEE/ACM International Symposium on Microarchitecture (MICRO-49), 2016, Tianqi Chen, et al. "Training deep nets with sublinear memory cost." arXiv preprint arXiv:1604.06174 (2016), and Song Han, Huizi Mao, and William J. Dally. "Deep compression: Compressing deep neural networks with pruning, trained quantization and huffman coding." arXiv preprint arXiv:1510.00149 (2015).

SUMMARY

According to an aspect of the embodiment, an information processing method implemented by a computer, the method includes: deciding a timing when transfer to a memory is completed in a total time that is a sum of a calculation time at one or plurality of second layers at which calculation is carried out earlier than a first layer regarding a timing when data relating to calculation of the first layer is stored in the memory based on a calculation time estimated in advance regarding each of one layer or a given number of layers in a plurality of layers included in a neural network and a time of transfer of data relating to calculation of each of the one layer or the given number of layers to the memory; and storing the data relating to calculation of the first layer in the memory based on the decided timing in sequentially carrying out calculation of each layer of the neural network.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

However, in the above-described related art, there is a problem that, in some cases, a waiting time arises at a layer about which the transfer time for data transfer between the host and the accelerator becomes longer than the calculation time.

For example, in the deep learning, the memory usage has become large due to increase in the number of hierarchical layers of the neural network and the memory usage further increases at the time of learning. For example, in the backpropagation used in supervised learning, data for learning is forward-propagated in the neural network and recognition is carried out, and the recognition result and the correct answer are compared to obtain an error. Furthermore, in the backpropagation, the error between the recognition result and the correct answer is propagated in the neural network in the direction opposite to that at the time of recognition and a parameter of each hierarchical layer of the neural network are changed. For this reason, at the time of learning, the memory usage increases and the transfer time for data transfer becomes long, so that a waiting time arises at a layer about which the transfer time becomes longer than the calculation time in some cases.

In one aspect, the embodiment discussed herein intends to provide an information processing apparatus, an information processing program, and an information processing method that enable reduction in the memory usage of an accelerator while suppressing the arising of a waiting time due to data transfer.

According to a first embodiment of the present disclosure, it is possible to reduce the memory usage of an accelerator while suppressing the arising of a waiting time due to data transfer.

An information processing apparatus, an information processing program, and an information processing method according to an embodiment will be described below with reference to the drawings. In the embodiment, configurations having the same function are given the same numeral and overlapping description is omitted. The information processing apparatus, the information processing program, and the information processing method described in the following embodiment merely represent one example and do not limit the embodiment. Furthermore, the following respective embodiments may be combined as appropriate in a range in which contradiction is not caused.

[Description of Deep Learning]

Figure 1:
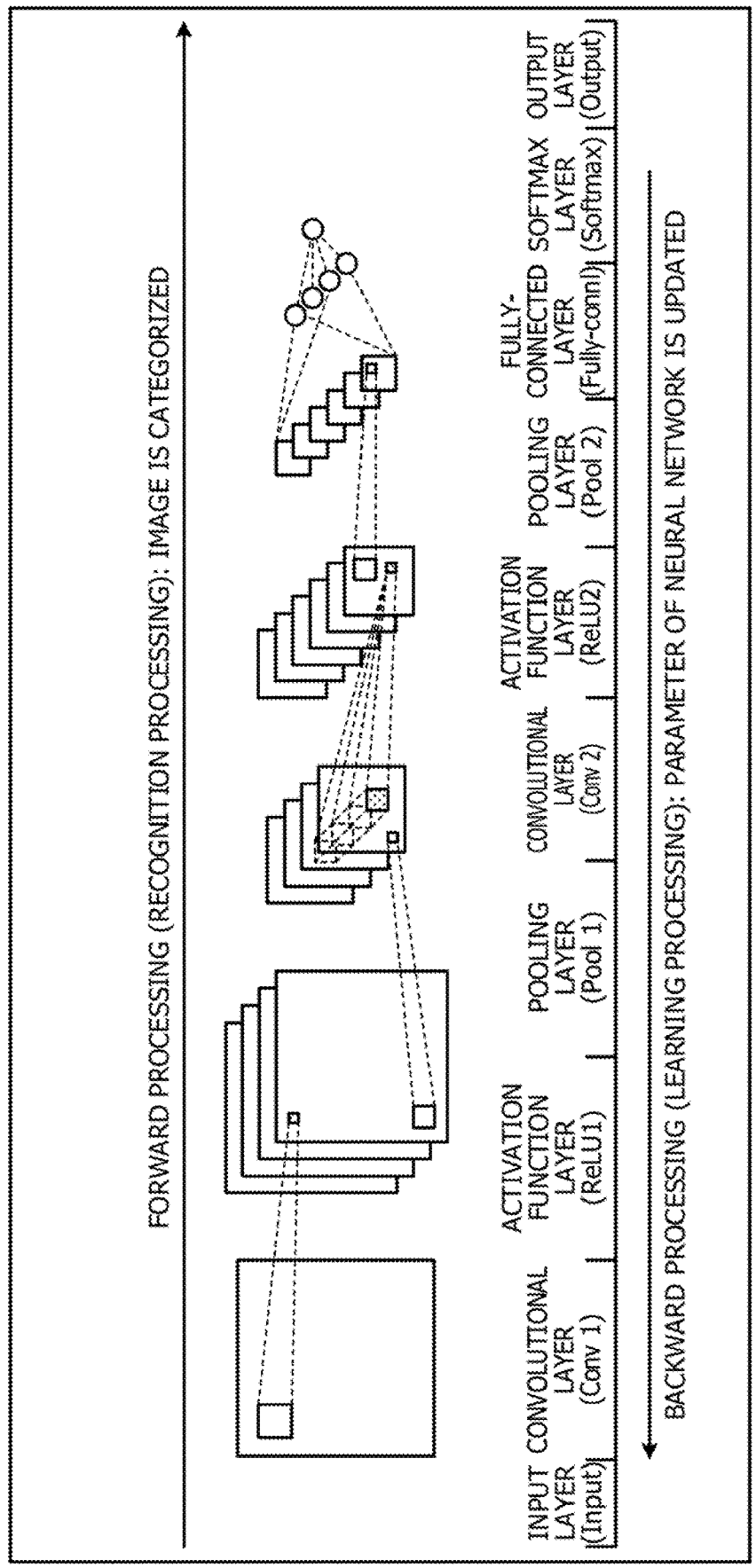
FIG. 1 schematically illustrates one example of a flow of processing of deep learning.

A description will be made about the deep learning. FIG. 1 is a diagram schematically illustrating one example of a flow of processing of deep learning.

In the deep learning, a neural network is caused to automatically learn features of an identification target by carrying out supervised learning relating to the identification target. In the deep learning, the identification target is identified by using the neural network that has learned the features. For example, in the deep learning, by carrying out supervised learning with use of a large amount of images in which an identification target is captured as images for learning, the neural network is caused to automatically learn features of the identification target captured in the images. In the deep learning, the identification target captured in an image may be identified by using the neural network that has learned the features in this manner.

In the brain, a large number of neurons (nerve cells) exist. Each neuron receives a signal from another neuron and passes the signal to another neuron. The brain carries out various kinds of information processing by this flow of the signal. The neural network is a model made by implementing characteristics of such functions of the brain on a computing machine. In the neural network, units that imitate the neurons of the brain are hierarchically joined. The unit is referred to also as a node. Each unit receives data from another unit and applies a parameter (weight) to the data to pass the data to another unit. The neural network may identify (recognize) various identification targets by changing the parameter of the units by learning and changing the data to be passed. In the following, data transmitted in the neural network will be referred to as neuron data.

In FIG. 1, as one example of the neural network, one example of a convolutional neural network (CNN) used for recognition of an image is illustrated. In the following, a description will be made by taking as an example the case in which recognition of an image is carried out by the convolutional neural network as the neural network.

The neural network is a hierarchical neural network having a hierarchical structure and may have plural intermediate layers between an input layer and an output layer. The plural intermediate layers include convolutional layer, activation function layer, pooling layer, fully-connected layer, and softmax layer, for example. The numbers and positions of the respective layers are not limited to those exemplified in FIG. 1 and may be changed at any time according to the requested architecture. For example, the hierarchical structure of the neural network and the configuration of each layer may be defined by the designer in advance according to the target to be identified and so forth.

In the neural network, in the case of carrying out identification of an image, as illustrated in FIG. 1, features of an identification target captured in the image are extracted by executing processing of each intermediate layer from left to right and identification (categorization) of the identification target captured in the image is carried out at the output layer at last. This processing is referred to as forward (FWD) processing or recognition processing. Meanwhile, in the neural network, in the case of carrying out learning of an image, the error between the result of identification and the correct answer is obtained and the error is backward-propagated in the neural network from right to left as illustrated in FIG. 1 to change the parameter (weight) of each intermediate layer. This processing is referred to as backward (BWD) processing or learning processing.

Figure 2A:
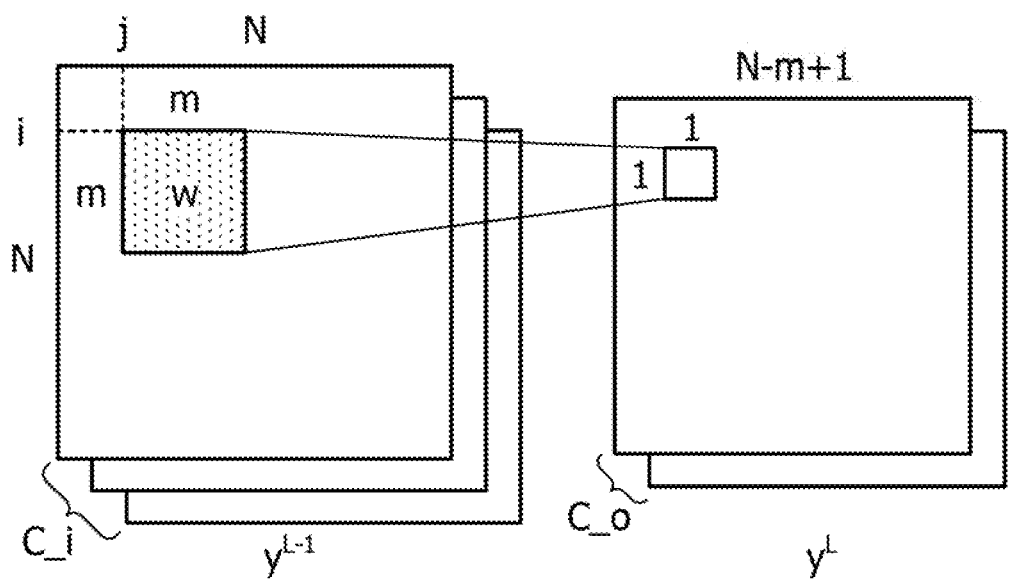
FIG. 2A schematically illustrates one example of convolution operation.

Next, arithmetic operation of each intermediate layer will be described. At the convolutional layer, convolution operation (convolution processing) of input neuron data is carried out and features of the input neuron data are extracted. FIG. 2A is a diagram schematically illustrating one example of convolution operation. In the example of FIG. 2A, the case of carrying out convolution operation of an input image of N×N pixels is illustrated. At the convolutional layer, neuron data for output to the next layer is created by regarding each of the values of the respective pixels of the image of N×N pixels as neuron data and calculating convolution with a filter with a size of m×m pixels for each of which a parameter is set.

At the activation function layer, the features extracted at the convolutional layer are emphasized. For example, at the activation function layer, firing (activation) is modeled by causing the neuron data for output to pass through an activation function σ. The firing refers to a phenomenon in which, when the value of a signal output from a neuron exceeds a certain value, the output signal is transmitted to another neuron.

For example, convolution operation represented by the following expression (1) is carried out at the convolutional layers (Conv1, Conv2) and, for the operation result, arithmetic operation of the activation function a represented by the following expression (2) is carried out at the activation function layers (ReLU1, ReLU2).

$$x_{ij}^L = \sum_{a=0}^{m-1}\sum_{b=0}^{m-1} w_{ab} y_{(i+a)(j+b)}^{L-1} \qquad (1)$$

$$y_{ij}^L = \sigma(x_{ij}^L) + b^L \qquad (2)$$

Here, $y^{L-1}_{(i+a)(j+b)}$ is neuron data as an input and is data of a pixel of (i+a, j+b) of the image $y^{L-1}$ of N×N pixels illustrated in FIG. 2A (layer L−1). $w_{ab}$ is each parameter that represents the weight of the m×m filter w illustrated in FIG. 2A. $x_{ij}^L$ is data of a pixel of (i, j) resulting from the convolution operation. $y_{ij}L$ is neuron data that is the output of a unit $U_i^L$ (layer L) as the result of application of the activation function σ to $x_{ij}^L$ and addition of a given bias $b^L$ and is also the input of the next layer L+1.

Figure 2B:
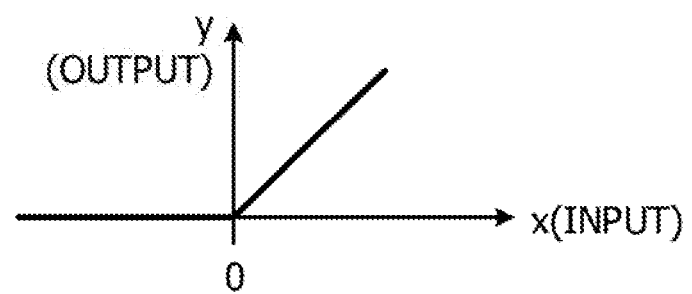
FIG. 2B schematically illustrates one example (ReLU) of an activation function.

As the activation function a used at the activation function layers (ReLU1, ReLU2), a non-linear activation function may be used and a rectified linear unit (ReLU) (ramp function) may be used, for example. FIG. 2B is a diagram schematically illustrating one example (ReLU) of an activation function. In the example of FIG. 2B, zero is output as an output y when an input x is smaller than zero. Furthermore, the value of the input x is output as the output y when the input x exceeds zero.

Figure 2C:
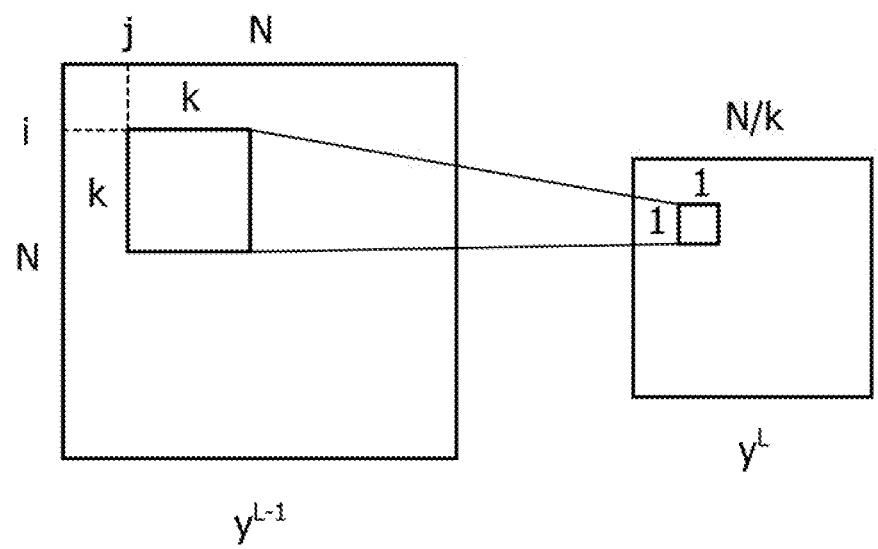
FIG. 2C schematically illustrates one example of decimation.

At the pooling layer, decimation of the input neuron data is carried out. FIG. 2C is a diagram schematically illustrating one example of decimation. For example, an image of N×N pixels is input as neuron data. At the pooling layer, decimation is carried out from the neuron data of N×N pixels to neuron data of (N/k)×(N/k). For example, for each region of k×k, the decimation is carried out by Max-Pooling to extract the maximum value. The decimation may be carried out by any other method. For example, the decimation may be carried out by Average-Pooling to extract the average of the region of k×k. Furthermore, at the pooling layer, regions of k×k for which decimation is carried out may be caused to partly overlap or the decimation may be carried out in such a manner that the regions are caused to be adjacent without being caused to overlap.

For example, Max-Pooling represented by the following expression (3) is carried out at the pooling layers (Pool1, Pool2).

$$y_{i,j}^L = \max(\{y_{i+a,j+b}^{L-1} | a,b \in [0,k-1]\}) \qquad (3)$$

Here, a function max is a function that outputs neuron data of the maximum value in the region of the range of k pixels in each of the horizontal and vertical directions from the pixel of (i, j) represented in FIG. 2C. $y_{i,j}^L$ is neuron data that is the output of a unit $U_i^L$.

At the fully-connected layer, the extracted features are connected and a variable that represents the features is generated. For example, at the fully-connected layer, fully-connected operation in which pieces of input neuron data are fully connected according to the number of targets about which identification is carried out. For example, an image of N×N pixels is input as neuron data. The fully-connected layer creates neuron data for output to the next layer by multiplying each of all of pieces of neuron data of N×N pixels by the weight (parameter).

The softmax layer converts the variable generated by the fully-connected layer to probability. For example, the softmax layer models the firing by carrying out arithmetic operation of causing the neuron data for output to pass through the activation function σ for normalization.

Figure 2D:
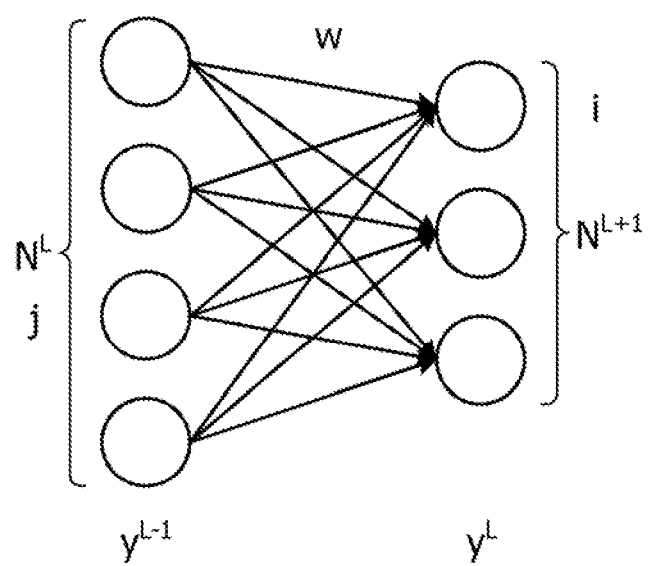
FIG. 2D schematically illustrates one example of full connection.

FIG. 2D is a diagram schematically illustrating one example of full connection. The example of FIG. 2D represents one example of the case of fully connecting each of j pieces of neuron data to obtain i pieces of neuron data when the number of targets for which identification is carried out is set to i. For example, arithmetic operation of full connection represented by the following expression (4) is carried out at the fully-connected layer (Fully-conn1) and, for the operation result, arithmetic operation represented by the following expression (5) is carried out at the softmax layer (Softmax).

$$x_i^L = \sum_j w_{ji}^{L-1} y_j^{L-1} \qquad (4)$$

$$y_i^L = \sigma(x_i^L) + b_i^L \qquad (5)$$

Here, $y_j^{L-1}$ is neuron data that is the output of a unit $U^{L-1}$ and is the input of the unit $U^L$. $w_{ji}^{L-1}$ is a parameter that represents the weight corresponding to $y_j^{L-1}$ and $y_i^L$. $x_i^L$ is data resulting from weighting operation. $y_i^L$ is neuron data that is the output of the unit $U_i^L$ as the result of application of the activation function σ to $x_i^L$ and addition of a given bias $b_i^L$.

As the activation function a used at the softmax layer (Softmax), a non-linear activation function may be used and a Softmax function may be used, for example. The neuron data as the operation result by the neural network is a real number. The softmax layer normalizes the neuron data of the operation result so that the result may be easily identified.

For example, the softmax layer (Softmax) normalizes the neuron data of the operation result into a range of 0 to 1 by using an activation function such as the Softmax function. The Softmax function is what is obtained by generalizing a logistic function and normalizes an n-dimensional vector x having arbitrary real numbers to an n-dimensional vector σ(x) that has real numbers in a (0, 1) section and in which the sum of the real numbers is 1. For example, arithmetic operation of the Softmax function represented by the following expression (6) is carried out at the output layer.

$$\sigma(x_i) = \frac{\exp(x_i)}{\sum_{i=1}^{n} \exp(x_j)} \qquad (6)$$

Thereby, n pieces of neuron data $x_i$ as the operation result by the neural network are converted to probability distribution of probability σ(x) of being each recognition target i. The neuron data of the operation result by the softmax layer (Softmax) is output to the output layer and identification is carried out at the output layer.

For example, in the case of carrying out identification of which of ten kinds an identification target captured in an image is, 10 pieces of neuron data are output from the fully-connected layer to the output layer via the softmax layer as the operation result. The output layer employs the kind of image corresponding to the neuron data with the highest probability distribution as the identification result. Furthermore, in the case of carrying out learning, the output layer compares the recognition result and the correct answer to obtain an error. For example, the output layer obtains the error from the objective probability distribution (correct answer) by using a cross entropy error function. For example, the output layer carries out arithmetic operation of an error function represented by the following expression (7).

$$E = -\sum_{i=1}^{n} t_i \log(y_i) \qquad (7)$$

Here, $t_i$ is the objective distribution and is set to 1 when the recognition target i is the correct answer and is set to 0 in the other cases. $y_i$ is the probability $\sigma(xi)$ of the recognition target i obtained by the arithmetic operation by the neural network.

In the deep learning, the neural network is caused to automatically learn features by carrying out supervised learning. For example, in the backpropagation used in the supervised learning, data for learning is forward-propagated in the neural network and recognition is carried out, and the recognition result and the correct answer are compared to obtain an error. Furthermore, in the backpropagation, the error between the recognition result and the correct answer is propagated in the neural network in the direction opposite to that at the time of recognition and a parameter of each hierarchical layer of the neural network are changed to make an approach to the optimum solution.

Next, one example of calculation of the error will be described. For example, in the backpropagation, arithmetic operation of partial differentiation of an error function represented by the following expression (8) is carried out as the error of the neuron data at the time of recognition.

$$\frac{\partial E}{\partial x_i^L} = y_i - t_i \qquad (8)$$

In the backpropagation, the gradient of the error of the parameter at the output layer (Output) is calculated from the following expression (9). At the softmax layer (Softmax) that carries out arithmetic operation of the Softmax function, the result of expression (8) is the gradient of the error of expression (9).

$$\frac{\partial E}{\partial x_i^L} = \sigma'(x_i^L) \frac{\partial E}{\partial y_i^L} \qquad (9)$$

Furthermore, in the backpropagation, the gradient of the error of input is calculated from the error at the output layer (Output) by using partial differentiation. For example, the gradient of the error of input is calculated from the following expression (10-1) at the activation function layers (ReLU1, ReLU2) that carry out arithmetic operation of an activation function such as ReLU. $\sigma'(x)$ results from partial differentiation of $\sigma(x)$ with respect to x and is obtained from the following expression (10-2). As x, the value used at the time of recognition is used. When $\sigma'(x)$ is substituted into expression (10-1), the gradient of the error ($\partial E/\partial x_i^L$) is obtained.

$$\frac{\partial E}{\partial x_j^L} = \sigma'(x_j^L) \frac{\partial E}{\partial y_j^L} \qquad (10\text{-}1)$$

$$\sigma'(x) = \begin{cases} 0 & (x \leq 0) \\ 1 & (\text{otherwise}) \end{cases} \qquad (10\text{-}2)$$

Moreover, in the backpropagation, the gradient of the error of the parameter is calculated regarding the layer having the parameter (weight) in arithmetic operation. For example, in the arithmetic operation of full connection represented in expression (4), the gradient of the error of the parameter is calculated from the following expression (11-1). Furthermore, in the convolution operation represented in expression (1), the gradient of the error of the parameter is calculated from the following expression (11-2). As $y_i^L$ obtained when calculation is carried out by using the chain rule of partial differentiation, the value used at the time of recognition is used.

$$\frac{\partial E}{\partial w_{ij}^L} = y_i^L \frac{\partial E}{\partial x_j^{L+1}} \qquad (11\text{-}1)$$

$$\frac{\partial E}{\partial w_{ab}} = \sum_{i=0}^{N-m} \sum_{j=0}^{N-m} \frac{\partial E}{\partial x_{ij}^L} \frac{\partial x_{ij}^L}{\partial w_{ab}} = \sum_{i=0}^{N-m} \sum_{j=0}^{N-m} \frac{\partial E}{\partial x_{ij}^L} y_{(i+a)(j+b)}^{L-1} \qquad (11\text{-}2)$$

Furthermore, in the backpropagation, the gradient of the error to the previous layer (L–1 layer) is figured out. For example, when the previous layer is the layer that carries out arithmetic operation of full connection, the gradient of the error to the previous layer is figured out from the following expression (12-1). Moreover, when the previous layer is the layer that carries out convolution operation, the gradient of the error to the previous layer is figured out from the following expression (12-2). As $w_{ij}^L$ obtained when calculation is carried out by using the chain rule of partial differentiation, the value used at the time of recognition is used. Furthermore, when the previous layer is the pooling layer (Pool1, Pool2) that carries out Max-Pooling, the gradient of the error ($\partial E/\partial x_i^L$) is added to the place from which the maximum value of the k×k region has been taken at the time of recognition. No operation is carried out for the other places of the k×k region.

$$\frac{\partial E}{\partial y_i^L} = \sum w_{ij}^L \frac{\partial E}{\partial x_j^{L+1}} \qquad (12\text{-}1)$$

$$\frac{\partial E}{\partial y_{ij}^{L-1}} = \sum_{a=0}^{m-1} \sum_{b=0}^{m-1} \frac{\partial E}{\partial x_{(i-a)(j-b)}^L} \frac{\partial x_{(i-a)(j-b)}^L}{\partial y_{ij}^{L-1}} = \sum_{a=0}^{m-1} \sum_{b=0}^{m-1} \frac{\partial E}{\partial x_{(i-a)(j-b)}^L} w_{ab} \qquad (12\text{-}2)$$

In the calculation of the error, backward propagation in the neural network is carried out and the calculation of the gradient of the error of each intermediate layer is repeated until the backward propagation reaches the input layer (Input), which is the layer at the uppermost level of the neural network. For example, the gradient of the error of input is calculated from the error at the output layer (Output) by using expression (10-1). For example, the error of input represented in expression (10-1) is obtained by substituting the gradient of the error of expression (9) when the lower layer is the output layer. Furthermore, the error of input represented in expression (10-1) is obtained by substituting the gradient of the error figured out from expression (12-1) or (12-2) when the lower layer is other than the output layer. Moreover, for example, the gradient of the error of the parameter represented in expression (11-1) is obtained by substituting the error figured out from expression (10-1). Furthermore, for example, the error to the previous layer represented in expression (12-1) is obtained by substituting the error figured out from expression (10-1). Moreover, in the calculation of the error, the parameters of all layers are updated according to the error.

The neural network is used for image recognition like that exemplified in FIG. 1 and FIGS. 2-1 to 2-4. Besides, the neural network may be applied to various kinds of recognition processing of sound recognition, language recognition, and so forth. To intend enhancement in the precision of this recognition processing, the number of layers of the neural network is increased and the neural network is made huge in some cases. When the neural network is made huge, the amount of calculation of the deep learning tends to be enormous. However, the speed of the processing may be enhanced by carrying out arithmetic operation by an accelerator (accelerator board) such as a graphics processing unit (GPU) or a dedicated chip. At this time, when the accelerator (accelerator board) is communicably coupled to a host (motherboard) and the deep learning is carried out with use of a memory on the host (host memory), the speed of the processing is restricted by the speed of data transfer of the communication path. The speed of data transfer between the accelerator and the host is low compared with data transfer in the accelerator and therefore the speed of the processing may be set higher when the processing is executed on a local memory in the accelerator.

The local memory in the accelerator involves a limit to the power consumption and the chip area in order to yield high performance. For example, the storage capacity of the local memory in the accelerator is limited compared with the storage capacity of the host memory. For example, the storage capacity of the host memory is several hundreds of GB whereas the storage capacity of the local memory in the accelerator is 16 GB and the possible neural network size is limited.

As a countermeasure there against, regarding at least part of the intermediate layers in the neural network, a memory region that is not being used at a certain calculation timing is saved from the accelerator to the host side. Then, at the time of start of calculation of each layer of the neural network, neuron data of another layer is transferred (prefetch) between the host and the accelerator and is read in again.

For example, the timing when data relating to calculation of a given layer (first layer) is stored in the memory of the accelerator is decided based on a calculation time estimated in advance regarding each layer of the neural network and a time of transfer of data relating to calculation of each layer to the memory of the accelerator. For example, the timing when transfer to the memory is completed in the total time of the calculation time at one or plural second layers at which calculation is carried out earlier than the first layer is decided. Then, when calculation of each layer of the neural network is sequentially carried out, the data relating to calculation of the first layer is stored in the memory of the accelerator based on the decided timing. By prefetching data in this manner, the memory usage of the accelerator may be reduced while the arising of a waiting time due to data transfer is suppressed. The timing when the data relating to calculation of the given layer is stored in the memory of the accelerator may be decided based on not the calculation time estimated in advance regarding each layer of the neural network and the time of transfer of the data relating to calculation of each layer to the memory of the accelerator but a calculation time estimated in advance regarding only any one layer of plural layers or each of a given number of layers and a time of transfer of data relating to calculation for this only any one layer of the plural layers or each of the given number of layers to the memory of the accelerator.

Figure 3:
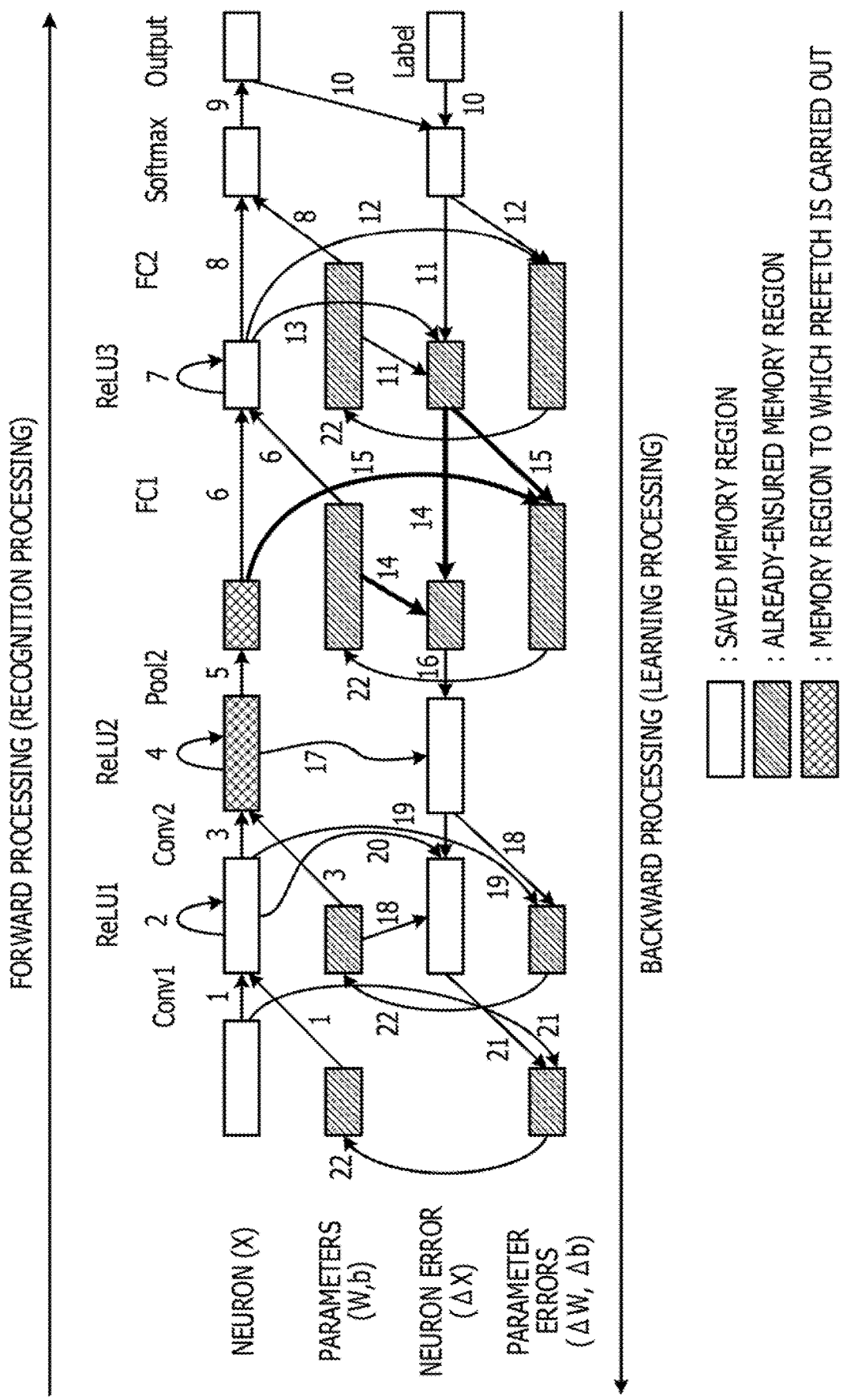
FIG. 3 illustrates one example of a flow of calculation of a neural network including intermediate layers for which prefetch is carried out.

FIG. 3 is a diagram illustrating one example of a flow of calculation of a neural network including intermediate layers for which prefetch is carried out. The example of FIG. 3 represents the respective pieces of data and the order of processing when learning of a convolutional neural network is carried out as the neural network. The neural network has a hierarchical structure in which the respective layers are sequentially lined up. The neural network sequentially includes the respective layers of input layer (Input), first convolutional layer (Conv1), first activation function layer (ReLU1), second convolutional layer (Conv2), second activation function layer (ReLU2), second pooling layer (Pool2), first fully-connected layer (FC1: Fully-Conn1), and third activation function layer (ReLU3). The neural network further sequentially includes the respective layers of second fully-connected layer (FC2: Fully-Conn2), softmax layer (Softmax), and output layer (Output). Furthermore, in FIG. 3, the case in which intermediate layers that execute in-place processing are the activation function layers (ReLU1, ReLU2, ReLU3) is exemplified.

In FIG. 3, "neuron (x)" represents the data size of neuron data of each layer. "Parameters (W, b)" represent the data size of the parameters of each layer. "Neuron error ($\Delta X$)" represents the data size of the gradient of the error of the neuron data of each layer. "Parameter errors ($\Delta W$, $\Delta b$)" represent the data size of the gradients of the errors of the parameters of each layer. Arrows represent the flow of the processing when learning of the neural network is carried out. Numerals given to the arrows represent the order of processing.

As illustrated in FIG. 3, in the case of carrying out learning of the neural network, forward (FWD) processing (recognition processing) is executed and thereafter backward (BWD) processing (learning processing) is executed. In the recognition processing, processing of identifying an image of a learning target is executed. For example, in the recognition processing, processing of each layer is executed for the image of the learning target in order of numerals "1" to "9" and the processing result is output.

Next, the learning processing of updating the parameters from the processing result of the recognition processing is executed. For example, in the learning processing, the identification result and the correct answer are compared to obtain an error as represented by numerals "10." Label represents the correct answer of the image of the learning target. Furthermore, in the learning processing, regarding the error between the recognition result and the correct answer, processing of figuring out the gradient of the error of each layer is executed in order of numerals "11" to "21." Moreover, in the learning processing, processing of changing the parameters of each hierarchical layer is executed as represented by numerals "22." The change in the parameters may be carried out at the timing when the gradient of the error is figured out for each hierarchical layer.

Here, the memory region that has been already used at the time of FWD is saved from the accelerator to the memory of the host. Then, the saved data is prefetched from the host to the accelerator by the time of calculation of each layer in the BWD to reduce the memory usage of the accelerator. For example, the timing when the prefetch of the first layer is completed in the total time of the calculation time at one or plural second layers at which calculation is carried out earlier than the first layer is decided based on the time of transfer to the memory estimated in advance regarding each layer and the calculation time. Then, the prefetch of the first layer is carried out at the decided timing to cause the transfer time in the prefetch to be hidden by the calculation time. In the example of FIG. 3, at the time of calculation of FC1 layer of the BWD, a prefetch is carried out to the two previous layers (ReLU2, Pool2) so that the transfer time may be hidden by the calculation time. This may suppress the arising of a waiting time due to data transfer.

[Configuration of Information Processing Apparatus]

Figure 4:
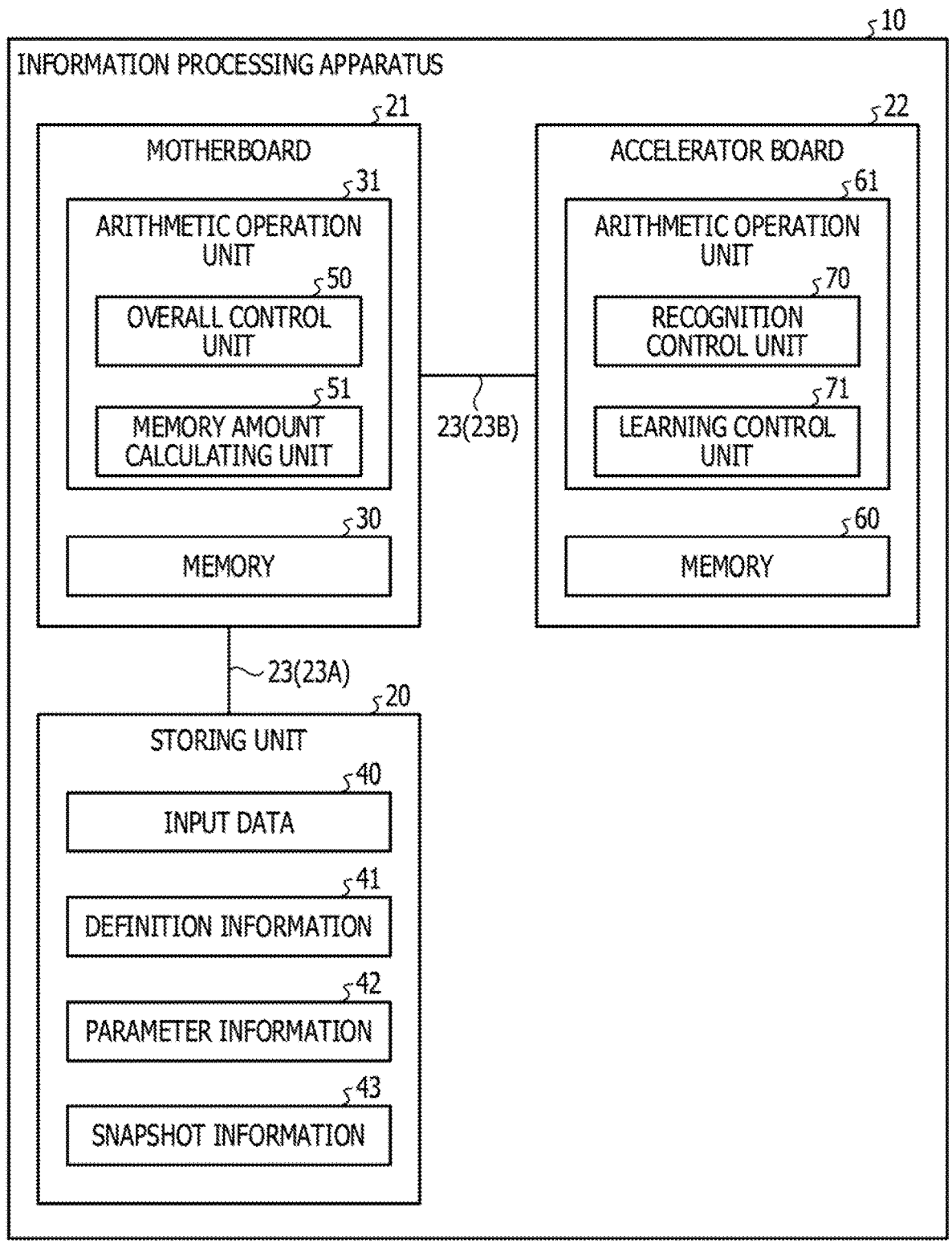
FIG. 4 schematically illustrates a functional configuration of an information processing apparatus according to an embodiment.

Next, an information processing apparatus that executes processing relating to the above-described deep learning will be described. FIG. 4 is a diagram schematically illustrating a functional configuration of an information processing apparatus according to the embodiment.

An information processing apparatus 10 illustrated in FIG. 4 is a recognition apparatus that carries out recognition of various subjects by using the deep learning. The information processing apparatus 10 is a computer such as a server computer. The information processing apparatus 10 may be implemented as one computer or may be implemented as a computer system based on plural computers. For example, in the deep learning described below, processing may be executed in a distributed manner in an information processing system based on plural computers. In the present embodiment, a description will be made by taking as an example the case in which the information processing apparatus 10 is implemented as one computer. Furthermore, in the present embodiment, a description will be made by taking as an example the case in which the information processing apparatus 10 carries out recognition of an image.

As illustrated in FIG. 4, the information processing apparatus 10 includes a storing unit 20, a motherboard 21, and an accelerator board 22. The information processing apparatus 10 may have other equipment other than the above-described equipment. For example, the information processing apparatus 10 may have an input unit that accepts various kinds of operation, a display unit that displays various kinds of information, and so forth.

The storing unit 20 is a storing apparatus such as a hard disk or solid state drive (SSD). The motherboard 21 is a board on which parts that assume main functions of the information processing apparatus 10 are mounted. The accelerator board 22 is a board on which hardware that is added and used is mounted in order to enhance the processing capability of the information processing apparatus 10. Plural accelerator boards 22 may be set. In the present embodiment, a description will be made by taking as an example the case in which one accelerator board 22 is set.

The storing unit 20, the motherboard 21, and the accelerator board 22 are coupled by buses 23 that may transfer data. For example, the storing unit 20 and the motherboard 21 are coupled by the bus 23A of serial advanced technology attachment (SATA), serial attached small computer systems interface (SAS), or the like. Furthermore, the motherboard 21 and the accelerator board 22 are coupled by the bus 23B of peripheral component interconnect (PCI) Express or the like.

In the deep learning, a large amount of arithmetic operation is carried out. For this reason, in the information processing apparatus 10, the speed of processing is enhanced by carrying out the arithmetic operation by the accelerator board 22 using an accelerator such as a GPU or dedicated chip.

The storing unit 20 stores an operating system (OS) and various programs that execute various kinds of processing to be described later. Moreover, the storing unit 20 stores various kinds of information. For example, the storing unit 20 stores input data 40, definition information 41, parameter information 42, and snapshot information 43. The storing unit 20 may store other various kinds of information.

The input data 40 is data regarded as an input target to the neural network. For example, in the case of carrying out supervised learning, the input data 40 is data for learning. For example, in the case of causing the neural network to learn features of an identification target captured in an image, the input data 40 is data in which a large number of images in which various identification targets are captured are associated with a label that represents a correct answer to what is the identification target. Furthermore, in the case of carrying out identification by the neural network, the input data 40 is data regarded as the identification target. For example, in the case of identifying an identification target captured in an image, the input data 40 is data of the image regarded as the identification target.

The definition information 41 is data in which information relating to the neural network is stored. For example, in the definition information 41, information that represents the configuration of the neural network, such as the hierarchical structure of the neural network, the configuration of the unit of each hierarchical layer, and the coupling relationship among the units is stored. In the case of carrying out recognition of an image, in the definition information 41, information that represents the configuration of a convolutional neural network defined by a designer or the like is stored, for example. Furthermore, in the definition information 41, information that represents a calculation time measured in advance regarding each layer of the neural network and a time of transfer of data relating to calculation of each layer to a memory 60 of the accelerator board 22 is stored. Moreover, in the definition information 41, information on a calculation model relating to prediction of the above-described calculate time and transfer time may be stored.

The parameter information 42 is data in which the values of parameters such as a weight value used in arithmetic operation of each layer of the neural network is stored. The values of the parameters stored in the parameter information 42 are set to given initial values in the initial state and are updated according to learning.

If the input data 40 is divided into every given number of items and batch processing of learning is repeated, the snapshot information 43 is data in which information relating to a midway processing state is stored.

The motherboard 21 includes a memory 30 and an arithmetic operation unit 31.

The memory 30 is a semiconductor memory such as a random access memory (RAM). The memory 30 stores information on processing executed by the arithmetic operation unit 31 and various kinds of information used in the processing.

The arithmetic operation unit 31 is a device that controls the whole of the information processing apparatus 10. As the arithmetic operation unit 31, an electronic circuit such as a central processing unit (CPU) or micro processing unit (MPU) may be employed. The arithmetic operation unit 31 functions as various processing units through running of various programs. For example, the arithmetic operation unit 31 includes an overall control unit 50 and a memory amount calculating unit 51.

The overall control unit 50 controls the whole of processing relating to deep learning. When accepting an instruction to start processing of deep learning, the overall control unit 50 reads out various programs and various kinds of information relating to the deep learning from the storing unit 20. For example, the overall control unit 50 reads out various programs to control the processing of the deep learning. Furthermore, the overall control unit 50 reads out the definition information 41 and the parameter information 42. The overall control unit 50 identifies the configuration of the neural network based on the definition information 41 and the parameter information 42 and decides the order of processing of recognition processing and learning processing of the neural network. The overall control unit 50 may decide the order of processing of the learning processing at the timing when the learning processing is started.

The overall control unit 50 reads out the input data 40 from the storing unit 20 in such a manner as to divide the input data 40 into every given number of items. Then, the overall control unit 50 transfers the read-out input data 40 and the information relating to the recognition processing and the learning processing to the accelerator board 22 and stores them in the memory 60. Then, the overall control unit 50 controls the accelerator board 22 to cause the accelerator board 22 to execute the recognition processing and the learning processing of the neural network.

For example, the overall control unit 50 acquires the time of transfer to the memory estimated in advance regarding each layer of the neural network and the calculation time from the definition information 41. Subsequently, based on the acquired transfer time and calculation time, the overall control unit 50 decides the timing when the prefetch of the first layer is completed in the total time of the calculation time at one or plural second layers at which calculation is carried out earlier than the first layer. Then, the overall control unit 50 stores (prefetches) the data of the first layer in the memory 60 of the accelerator board 22 at the decided timing to cause the transfer time in the prefetch to be hidden by the calculation time.

The memory amount calculating unit 51 figures out the amount of memory used for storing of data in the deep learning. For example, the memory amount calculating unit 51 figures out the amount of memory used for storing of the neuron data, the parameters, the error of the neuron data, and the errors of the parameters at each layer of the neural network based on the definition information 41.

The accelerator board 22 includes the memory 60 and an arithmetic operation unit 61.

The memory 60 is a semiconductor memory such as a RAM. The memory 60 stores information on processing executed by the arithmetic operation unit 61 and various kinds of information used in the processing.

The arithmetic operation unit 61 is a device that controls the accelerator board 22. As the arithmetic operation unit 61, an electronic circuit such as a GPU, application specific integrated circuit (ASIC), or field-programmable gate array (FPGA) may be employed. The arithmetic operation unit 61 functions as various processing units through running of various programs according to control from the overall control unit 50. For example, the arithmetic operation unit 61 includes a recognition control unit 70 and a learning control unit 71.

The recognition control unit 70 controls the recognition processing of the neural network. For example, the recognition control unit 70 treats the data stored from the motherboard 21 as neuron data and executes the recognition processing in accordance with the order of processing. The recognition control unit 70 carries out arithmetic operation of each layer of the neural network for the neuron data and holds each of the neuron data and the parameters of each layer of this neural network in the memory 60.

The learning control unit 71 controls the leaning processing of the neural network. For example, the learning control unit 71 obtains the error between the identification result by the recognition processing and the correct answer based on the data stored from the motherboard 21 and executes the learning processing of propagating the error in the neural network in accordance with the order of processing. The learning control unit 71 figures out the gradient of the error of each layer of the neural network from the error and learns the parameters.

[Flow of Processing]

Figure 5:
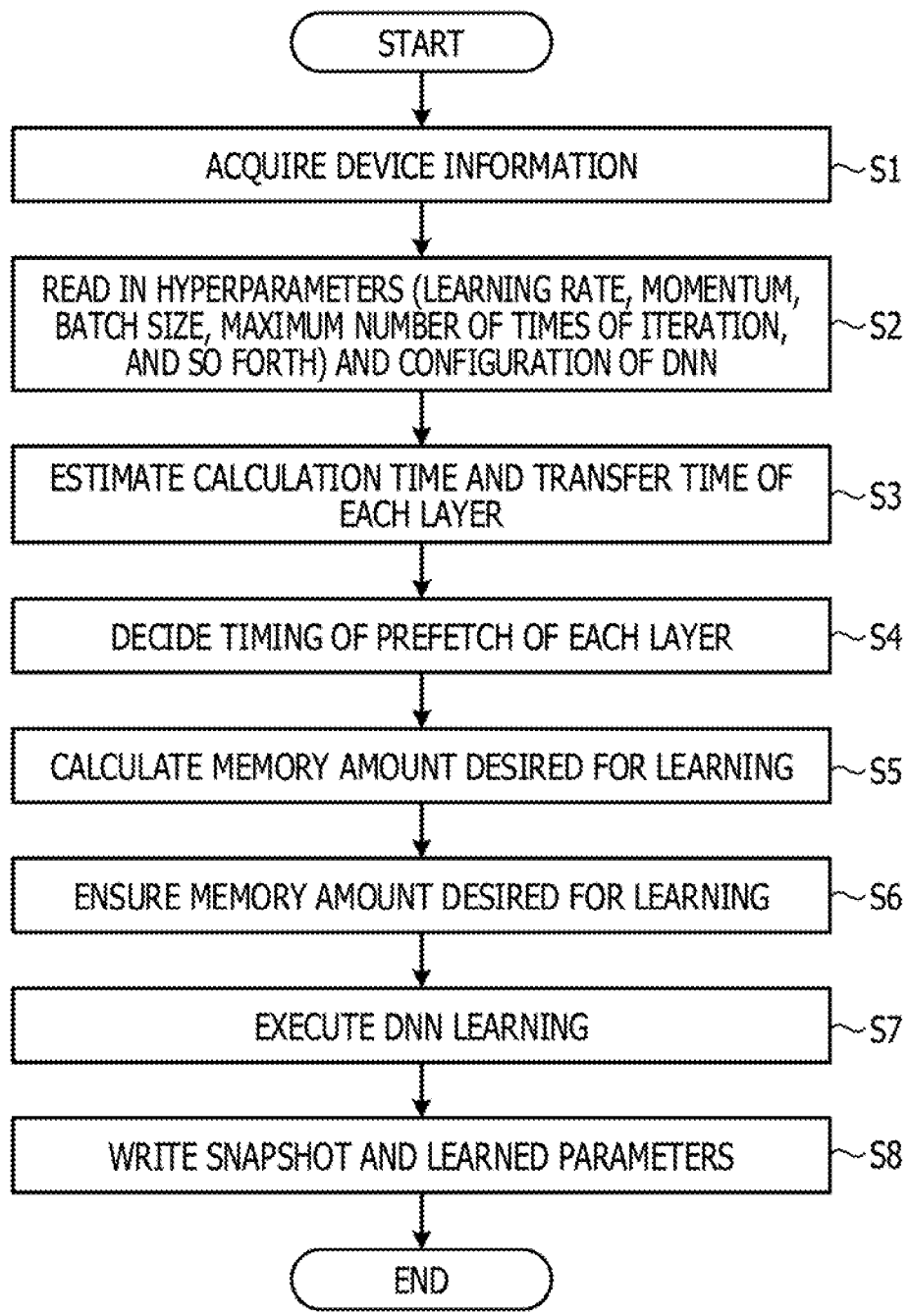
FIG. 5 is a flowchart illustrating an operation example of an information processing apparatus according to the embodiment.

Next, the flow of processing in an information processing method carried out by the information processing apparatus 10 will be described. FIG. 5 is a flowchart illustrating an operation example of an information processing apparatus according to the embodiment. This information processing method is carried out at a given timing, for example, at a timing when an instruction to start the processing is made from an administrator.

As illustrated in FIG. 5, when the processing is started, the overall control unit 50 acquires device information (capacity of the memory 60, free space, and so forth) of the accelerator board 22 (S1). Subsequently, the overall control unit 50 reads out the definition information 41 and the parameter information 42 and reads in hyperparameters (learning rate, momentum, batch size, the maximum number of times of iteration, and so forth) and the configuration of a deep neural network (DNN) (S2). For example, the overall control unit 50 acquires the number max_iter of times of iteration of learning execution. Furthermore, the overall control unit 50 identifies the configuration of the neural network and acquires the number n of layers of the DNN based on the definition information 41 and the parameter information 42. Moreover, the memory amount calculating unit 51 figures out the data size of the amount of memory used for storing of the error of the neuron data and the parameters at each layer of the neural network in recognition and learning based on the definition information 41.

Subsequently, the overall control unit 50 refers to the definition information 41 and estimates the calculation time and the transfer time of each layer of the neural network (S3). Regarding these calculation time and transfer time, the overall control unit 50 may read out data measured in advance from the definition information 41 and carry out the estimation. Furthermore, the overall control unit 50 may carry out the estimation of the calculation time and the transfer time by using a publicly-known calculation model. For example, the overall control unit 50 reads out information relating to the calculation model from the definition information 41 and estimates the calculation time and the transfer time of each layer by using the read-out calculation model.

For example, the estimation of the calculation time ($C_i$) and the transfer time ($m_i$) at a given layer (i) by the calculation model is represented by the following expressions (13) and (14).

$$m_i = \alpha_{H2D} \times (b \times c_{x\_i} \times h_{x\_i} \times w_{x\_i}) + \beta_{H2D} \quad (13)$$

$$\left.\begin{array}{l} c^{conv}_i = \alpha_{conv} \times \\ \{b \times (32 \times \lceil c_{x\_i+1}/32 \rceil) \times h_{x\_i} \times w_{x\_i+1} \times c_{x\_i} \times r_{w\_i} \times s_{w\_i}\} + \beta_{conv} \\ c^{pool}_i = \ldots \\ c^{fc}_i = \ldots \\ c^{softmax}_i = \ldots \end{array}\right\} \quad (14)$$

Here, $\alpha_{H2D}$ and $\alpha_{conv}$ are values that represent the throughput of the memory and arithmetic unit. $\beta_{H2D}$ and $\beta_{conv}$ are values that represent the latency of the memory and arithmetic unit. As the values of these $\alpha_{H2D}$, $\beta_{H2D}$, $\alpha_{conv}$, and $\beta_{conv}$, values measured in advance in the execution environment are stored in the definition information 41. Furthermore, the superscript in $C_i$ represents the kind of layer (convolutional layer (cony), pooling layer (pool), fully-connected layer (fc), softmax layer (softmax) . . . ).

Subsequently, the overall control unit 50 decides the timing of the prefetch at each layer (i) of the neural network based on the estimated calculation time ($C_i$) and transfer time ($m_i$) at each layer (i) (S4).

In the present embodiment, data of the neuron (x) (see FIG. 3) is employed as the target of the prefetch of each layer. The reason why the neuron (x) is employed as the target of the prefetch as above is because the neuron (x) has a large data size compared with the parameters (W, b) in many cases. Also regarding the parameters (W, b), the prefetch may be carried out similarly to the neuron (x). However, in the case of prefetching the parameters (W, b), the parameters are updated by using W and ΔW and b and Δb after the BWD. For this reason, immediately after the BWD of each layer, the parameters of the layer are updated. Alternatively, after the end of the BWD of all layers, W, ΔW, b, and Δb are read in the memory 60 again for update of the parameters.

The overall control unit 50 regards the neuron (x) of the BWD of the final layer as what is excluded from the target of saving to the memory 60 (what has been already ensured before the start of learning). Suppose that the calculation time of the BWD of the first layer does not give an influence to the prefetch.

Figure 6:
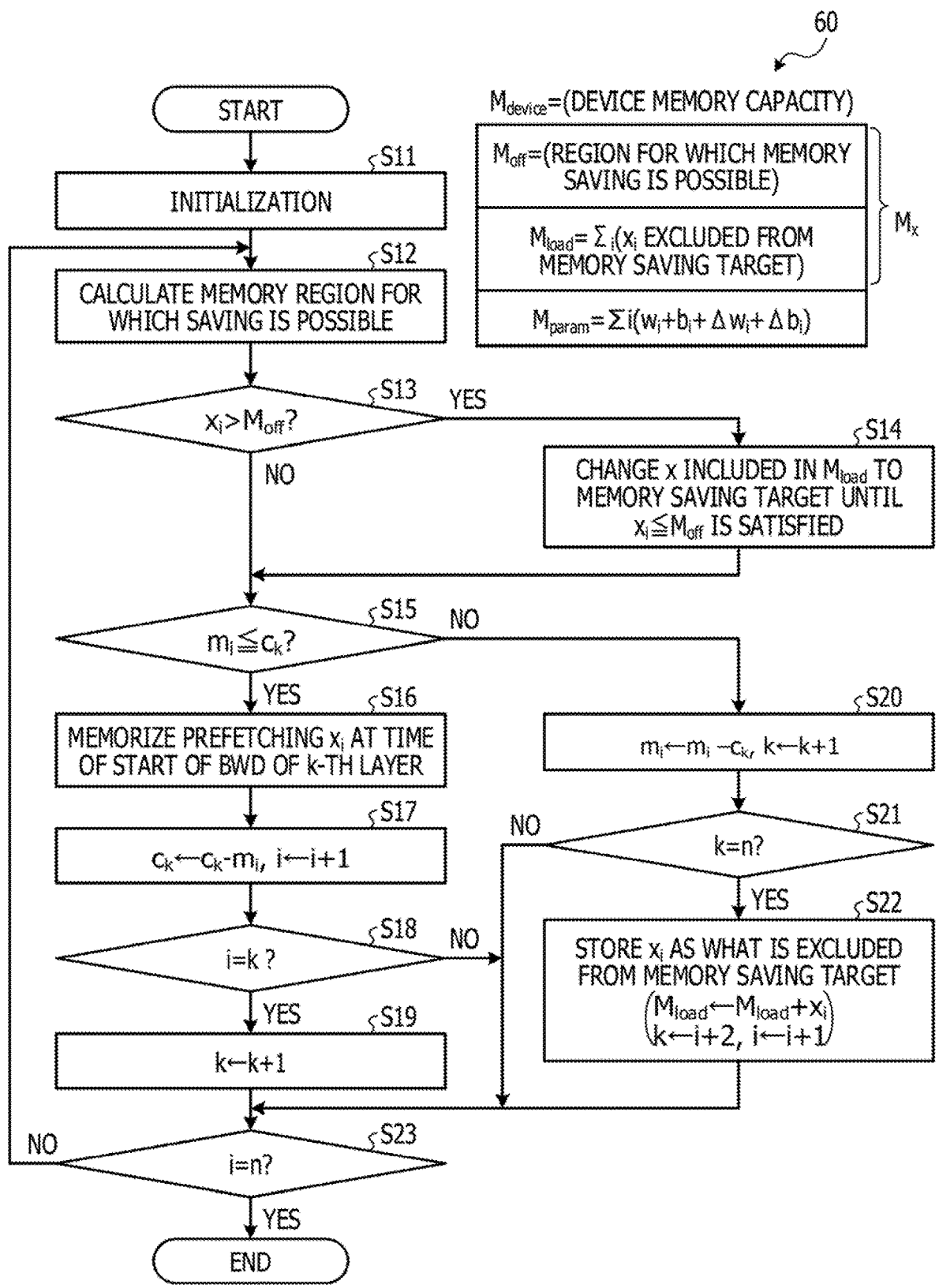
FIG. 6 is a flowchart illustrating one example of a method for deciding a timing of prefetch.

Here, the timing decision of the prefetch at each layer (i) will be described in detail. FIG. 6 is a flowchart illustrating one example of a method for deciding a timing of prefetch.

As illustrated in FIG. 6, regarding the memory 60 of the accelerator board 22, $M_{device}$ is defined as the memory capacity of the device. Furthermore, $M_{off}$ is defined as the amount of memory for which memory saving is possible. $M_{load}$ is the memory amount of the neuron (x) excluded from the memory saving target and is defined as $\Sigma_i(x_i$ excluded from the memory saving target). Thus, a memory amount ($M_x$) that may be used for the neuron (x) is $M_{off}+M_{load}$. Moreover, $M_{param}$ is the memory amount of the parameters other than the neuron (x). The parameters and so forth other than the neuron (x) are stored in the memory 60 in advance and therefore $M_{param}=\Sigma_i(W_i+b_i+\Delta W_i+\Delta b_i)$ is defined.

When the processing is started, the overall control unit 50 carries out initialization of variables relating to the processing (S11). For example, the overall control unit 50 initializes a layer number (i) of the transfer time (m) and a layer number (k) of the calculation time (c). For example, regarding the layer number (i) of the transfer time (m), each layer ("Conv1," "Conv2," "Pool2," "FC1," "ReLU3," "FC2," "Softmax," "Output" (see FIG. 3)) is employed as the target of the prefetch sequentially from the left in the BWD and i=1 is set. Furthermore, regarding the layer number (k) of the calculation time (c), the layer at which calculation is carried out earlier than the layer employed as the target of the prefetch (in the example of FIG. 3, layer on the right side in the BWD) is the target and k=2 is set with respect to i=1.

Furthermore, the overall control unit 50 initializes the memory amount ($M_x$) that may be used for the neuron (x), the memory amount ($M_{load}$) of the neuron (x) excluded from the memory saving target, and storing (pre(j)) of the neuron (x) prefetched at the time of start of the j-th layer. For example, $M_x$ is set to $M_{device}-\Sigma_j(W_j+b_j+\Delta W_j+\Delta b_j)$. Furthermore, $M_{load}$ is set to $M_{load}=x_n$. pre(j) is set to pre(j)=0(∀j).

Subsequently, the overall control unit 50 calculates the memory region ($M_{off}$) for which saving is possible (S12). For example, the overall control unit 50 calculates $M_{off} \leftarrow M_x - M_{load} - \max_j\{x_j + \Delta x_j + \Delta x_{j+1}\} + \Sigma l \geq j\{x_{l'}= \text{pre}(l) \| l' < j\}$.

Subsequently, the overall control unit 50 determines whether or not $x_i > M_{off}$ is satisfied to determine whether or not the data amount of the neuron (x) of the i-th layer exceeds the amount of memory for which saving is possible (S13).

If the data amount of the i-th layer exceeds the amount of memory for which saving is possible (S13: YES), the overall control unit 50 changes the neuron (x) included in $M_{load}$ to the memory saving target until $x_i \leq M_{off}$ is satisfied (S14). For example, the neuron (x) excluded from the memory saving target is changed to memory saving-prefetch target (memory saving is possible). By executing this processing of S14, the BWD for the neuron (x) of the i-th layer is kept from falling into memory shortage.

Subsequently, the overall control unit 50 compares the transfer time ($m_i$) of the neuron (x) of the i-th layer and the calculation time ($c_k$) of the k-th layer at which calculation is carried out earlier than the i-th layer and determines whether or not $m_i \leq c_k$ is satisfied (S15).

If $m_i \leq c_k$ is satisfied and the transfer time is shorter than the calculation time (S15: YES), the transfer time is hidden by the calculation time. Thus, the overall control unit 50 memorizes prefetching the neuron ($x_i$) at the time of start of the BWD of the k-th layer (S16).

Subsequently, the overall control unit 50 subtracts the transfer time of the prefetch that may be hidden by the BWD of the k-th layer from the calculation time ($c_k$) ($c_k \leftarrow c_k - m_i$), and increments i (i←i+1) (S17).

Subsequently, the overall control unit 50 determines whether or not i=k is satisfied (S18). If the layer number (i) of the memory transfer has reached the layer number (k) of the calculation (S18: YES), what is hidden by the BWD of the k-th layer does not exist further and therefore the overall control unit 50 increments the layer number (k) of the calculation by one (S19) and forwards the processing to S23. If the layer number (i) of the memory transfer has not reached the layer number (k) of the calculation (S18: NO), the overall control unit 50 forwards the processing to S23 without incrementing the layer number (k) of the calculation.

If the transfer time is longer than the calculation time in S15 (S15: NO), the transfer time is not hidden by the calculation time and therefore the prefetch is started from a layer closer to the front side (k+1 or closer to the front side than k+1). At this time, the calculation time of the BWD of the k-th layer is also included in the hiding time. Therefore, the overall control unit 50 subtracts the calculation time ($c_k$) of the k-th layer from the transfer time ($m_i$) to be hidden ($m_i \leftarrow m_i - c_k$) and increments the layer number (k) of the calculation (k←k+1) (S20).

Subsequently, the overall control unit 50 determines whether or not k=n is satisfied (S21). If the transfer time is not hidden from the layer closest to the front side (k=n) (S21: YES), the hiding by the calculation time is difficult. In this case, the overall control unit 50 ensures the memory region before the BWD start and stores the neuron ($x_i$) in the memory 60 as what is excluded from the memory saving target (S22). At this time, the overall control unit 50 sets $M_{load} \leftarrow M_{load} + x_i$, k←i+2, and i←i+1.

If k=n is not satisfied (S21: NO), the overall control unit 50 skips the processing of S22 and forwards the processing to S23.

In S23, the overall control unit 50 determines whether or not i=n is satisfied. If i=n is satisfied and the layer number (i) of the transfer time has reached the layer (n) closest to the front layer (S23: YES), the overall control unit 50 ends the processing. If the layer number (i) has not reached the layer (n) (S23: NO), the overall control unit 50 returns to S12 to continue the processing.

Figure 7:
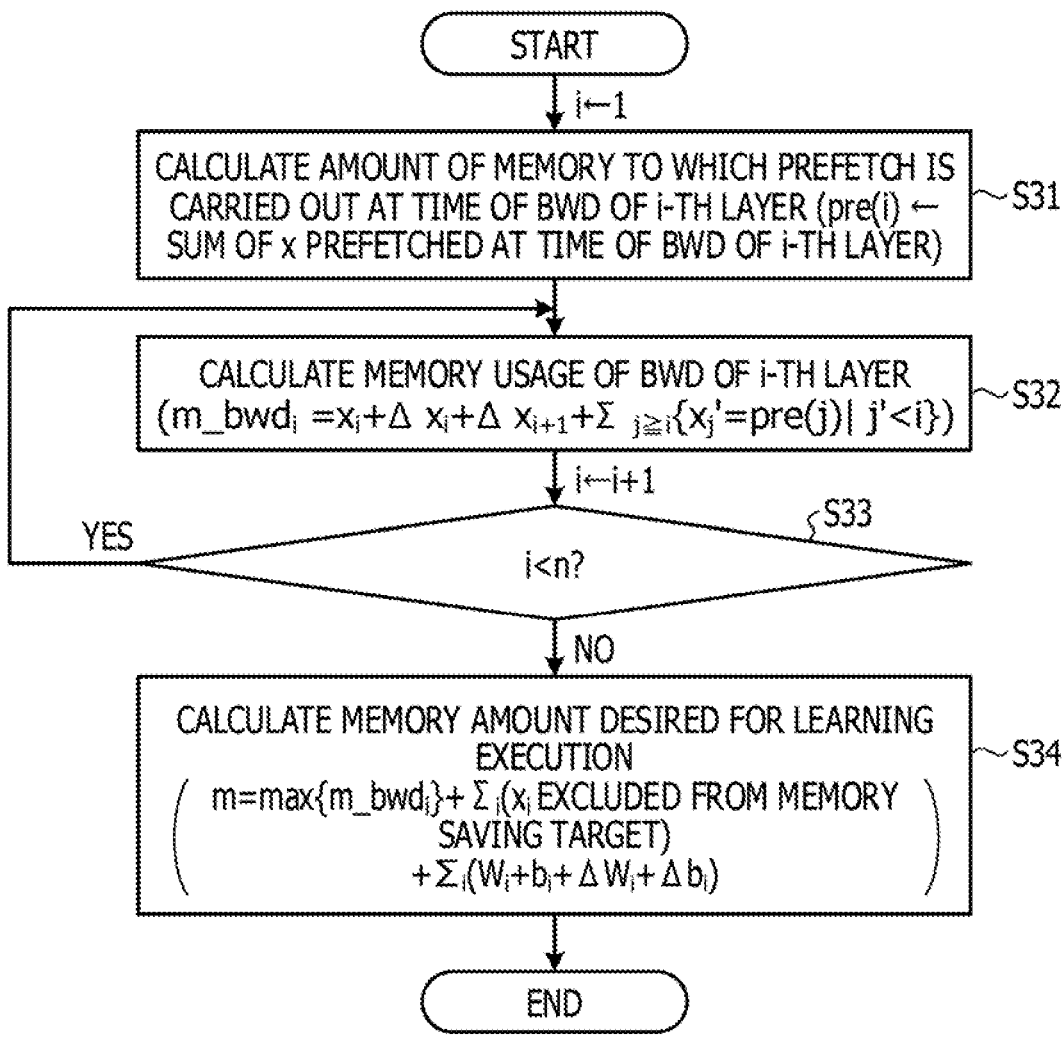
FIG. 7 is a flowchart illustrating one example of a method for calculating a memory amount.

Referring back to FIG. 5, subsequently to S4, the memory amount calculating unit 51 calculates the memory amount desired for learning (S5). FIG. 7 is a flowchart illustrating one example of a method for calculating a memory amount.

As illustrated in FIG. 7, when the processing is started, the memory amount calculating unit 51 sets the layer number (i) to i←1 and calculates the amount of memory to which the prefetch is carried out at the time of BWD of the i-th layer (S31). For example, the memory amount calculating unit 51 carries out the calculation as pre(i)← the sum of x prefetched at the time of BWD of the i-th layer.

Subsequently, the memory amount calculating unit 51 calculates memory usage (m_bwd$_i$) of the BWD of the i-th layer (S32). For example, the memory amount calculating unit 51 carries out the calculation as m_bwd$_i$=x$_i$+Δx$_i$+Δx$_{i+1}$+Σ$_{j≥i}$ {x$_j$=pre(j)|j'<i}.

Subsequently, the memory amount calculating unit 51 increments i (i←i+1) and determines whether or not i<n is satisfied (S33). If i<n is satisfied (S33: YES), the memory amount calculating unit 51 returns the processing to S32.

If i<n is not satisfied (S33: NO), the memory amount calculating unit 51 calculates the memory amount desired for learning execution (S34) and ends the processing. For example, the memory amount calculating unit 51 carries out the calculation as m=max{m_bwd$_i$}+Σ$_i$(x$_i$ excluded from the memory saving target)+Σ$_i$(W$_i$+b$_i$+ΔW$_i$+Δb$_i$).

Figure 8:
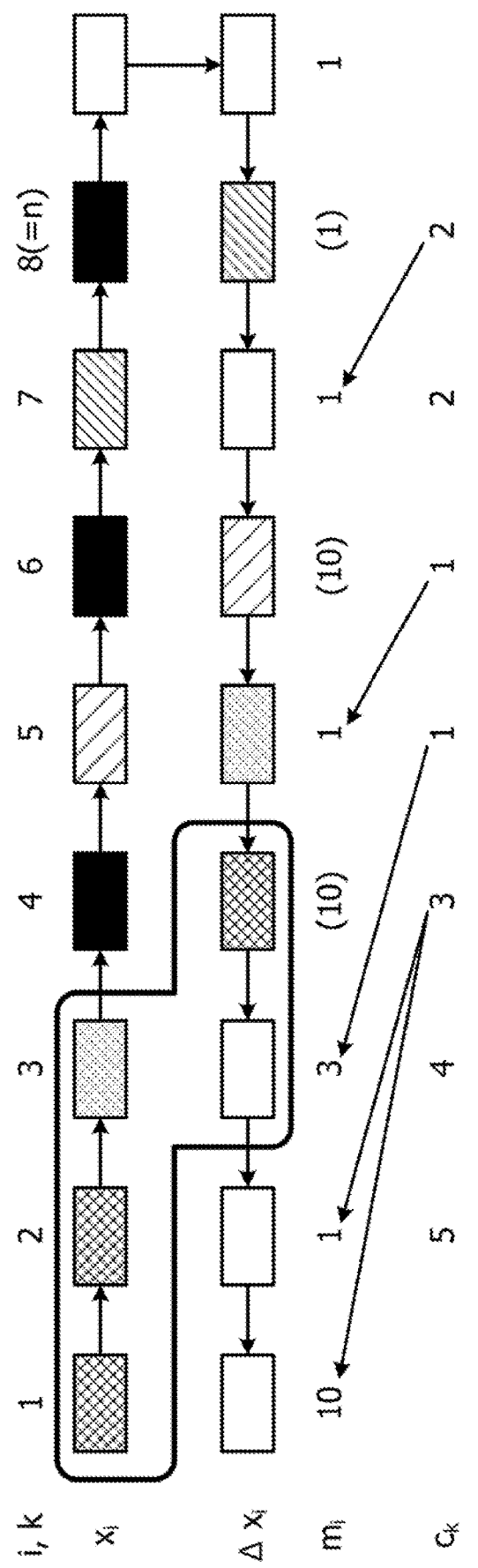
FIG. 8 is an explanatory diagram illustrating one example of a memory-use region.

In the above-described calculation of the memory amount, the sum of the memory region with the layer that yields the maximum memory usage (at the time of BWD) in the memory region regarded as the saving target is obtained. FIG. 8 is an explanatory diagram illustrating one example of a memory-use region. In FIG. 8, the memory-use region at the time of calculation of the third layer of the BWD is exemplified. In the example of FIG. 8, the sum of the memory-use region at the time of calculation of the third layer of the BWD is x$_1$+X$_2$+X$_3$+ΔX$_3$+ΔX$_4$.

Referring back to FIG. 5, the overall control unit 50 ensures the memory amount desired for the learning from the memory 60 (S6). Here, the overall control unit 50 collectively ensures the memory amount calculated in S5 from the memory 60. Then, the overall control unit 50 statically allocates pointers to the parameters and the memory region regarded as being excluded from the saving target (ensured before the start of learning) from the ensured memory region of the memory 60. Regarding the memory region regarded as the saving target, a pointer is allocated thereto when the memory region is used (at the time of prefetch) from the memory region ensured in advance and the pointer is freed (memory saving) after the use.

Subsequently, the overall control unit 50 carries out memory saving and prefetch by using the ensured memory region and executes DNN learning by the accelerator board 22 (S7).

Figure 9:
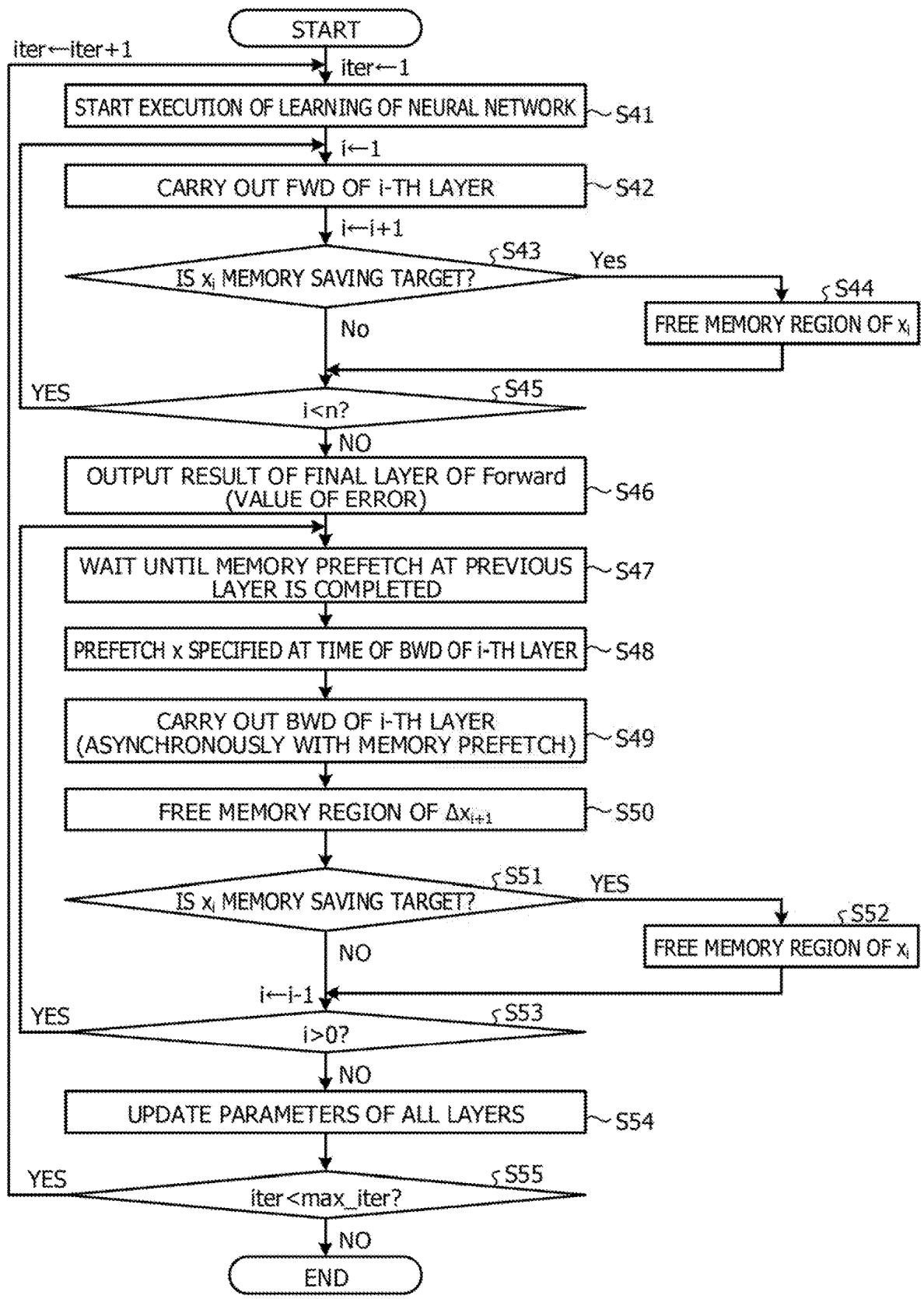
FIG. 9 is a flowchart illustrating one example of execution of DNN learning.

FIG. 9 is a flowchart illustrating one example of execution of DNN learning. As illustrated in FIG. 9, when the processing is started, the overall control unit 50 initializes a parameter (iter) for counting the number of times of the learning execution to 1.

Subsequently, the overall control unit 50 reads out the input data 40 from the storing unit 20 in such a manner as to divide the input data 40 into every given number of items. Then, the overall control unit 50 offloads the read-out data and information relating to the recognition processing and the learning processing to the accelerator board 22 and starts the learning of the neural network (S41) to execute the recognition processing (S42 to S46) and the learning processing (S47 to S54).

When the recognition processing is started, the recognition control unit 70 initializes the parameter i for counting the number of layers to 1 and reads out data corresponding to one item that has not been processed from the data offloaded from the motherboard 21. Then, the recognition control unit 70 employs the read-out data as neuron data and carries out FWD of the i-th layer for the neuron data in the order of neural network (S42).

Subsequently, the recognition control unit 70 determines whether or not the neuron (x$_i$) of the i-th layer is the memory saving target (S43). The neuron (x$_i$) is the memory saving target if it is not stored as what is excluded from the memory saving target in S22. If the neuron (x$_i$) is the memory saving target (S43: YES), the recognition control unit 70 frees the memory region of the neuron (x$_i$) in the memory 60 (S44) and forwards the processing to S45. If the neuron (x$_i$) is what is excluded from the memory saving target (S43: NO), the recognition control unit 70 forwards the processing to S45 without freeing the memory region of the neuron (x$_i$).

In S45, the recognition control unit 70 determines whether or not i<n is satisfied (S45). If i<n is satisfied (S45: YES), the recognition control unit 70 increments i and returns the processing to S42 to continue the FWD relating to the next layer.

If i<n is not satisfied (S45: NO), the recognition control unit 70 outputs the result of the final layer of Forward (value of the error) (S46) and ends the recognition processing.

When the learning processing is started, the learning control unit 71 waits for the start of the processing until the memory prefetch at the previous layer is completed regarding the i-layer of the calculation target in the BWD (S47). Here, the overall control unit 50 prefetches the neuron (x) specified at the time of BWD of the i-th layer to the memory 60 (S48).

The learning control unit 71 carries out the BWD of the i-th layer (asynchronously with the memory prefetch) (S49). Subsequently, the learning control unit 71 frees the memory region of Δx$_{i+1}$ in the memory 60 (S50) and determines whether or not the neuron (x$_i$) is the memory saving target (S51).

The neuron (x$_i$) is the memory saving target if it is not stored as what is excluded from the memory saving target in S22. If the neuron (x$_i$) is the memory saving target (S51: YES), the learning control unit 71 frees the memory region of the neuron (x$_i$) in the memory 60 (S52) and forwards the processing to S53. If the neuron (x$_i$) is what is excluded from the memory saving target (S51: NO), the learning control unit 71 forwards the processing to S53 without freeing the memory region of the neuron (x$_i$).

In S53, the learning control unit 71 decrements i and determines whether or not i>0 is satisfied (S53). If i>0 is satisfied (S53: YES), the learning control unit 71 returns the processing to S47 and continues the BWD relating to the next layer.

If i>0 is not satisfied (S53: NO), the learning control unit 71 updates the parameters based on the gradient of the error of the parameter for each layer regarding all layers of the neural network (S54).

Subsequently, the overall control unit 50 determines whether or not the parameter iter is smaller than the number max_iter of times of iteration of the learning execution (S55). If the parameter iter is smaller than the number of times of iteration (S55: YES), the overall control unit 50 adds 1 to the parameter iter and returns the processing to S41. If the parameter iter is not smaller than the number of times of iteration (S55: NO), the overall control unit 50 ends the processing.

Referring back to FIG. 5, subsequently to S7, the overall control unit 50 writes the processing result of S7 to the snapshot information 43 and the parameter information 42 (S8) and ends the processing.

Figure 10A:
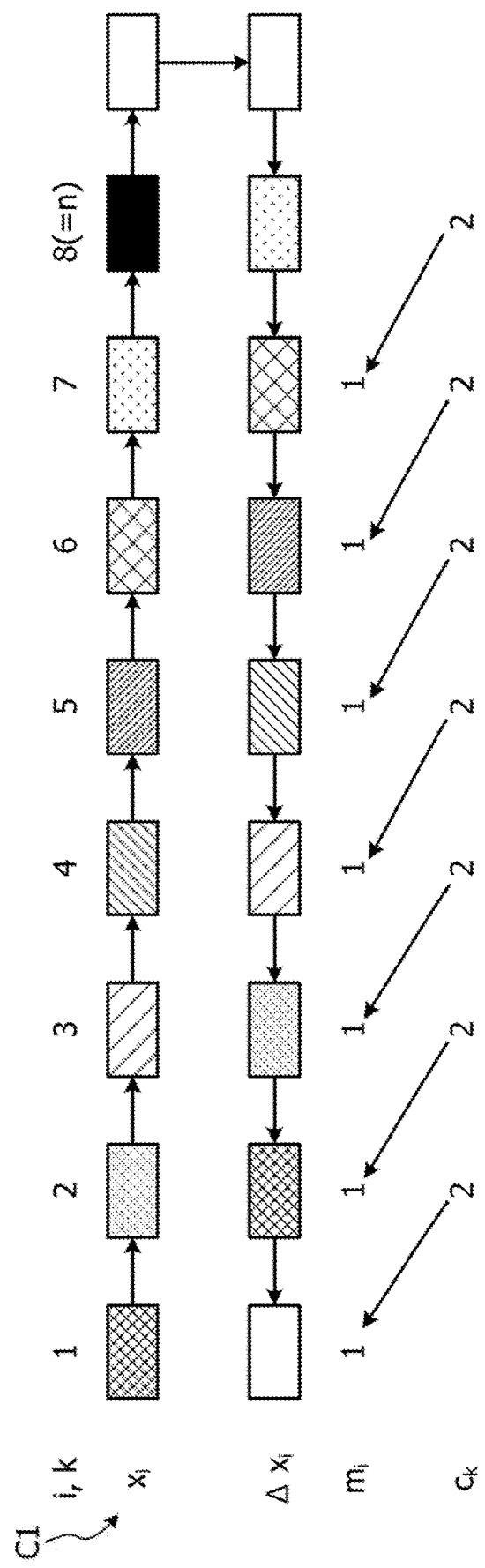
FIG. 10A is an explanatory diagram that explains one example of prefetch.
Figure 10B:
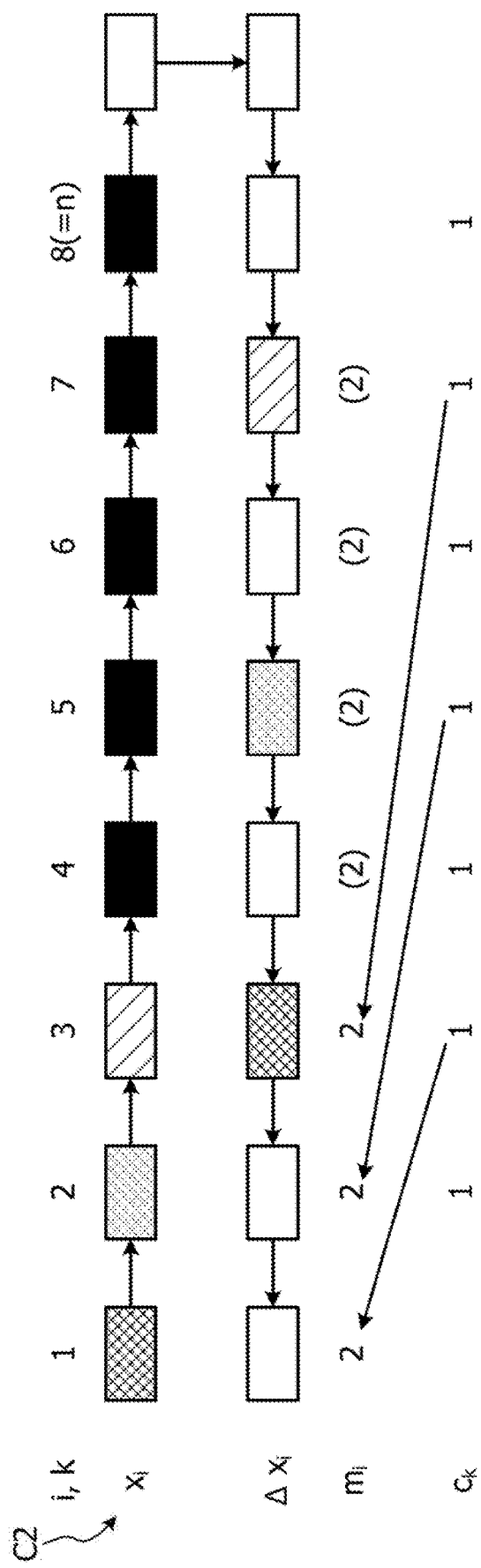
FIG. 10B is an explanatory diagram that explains one example of prefetch.
Figure 10C:
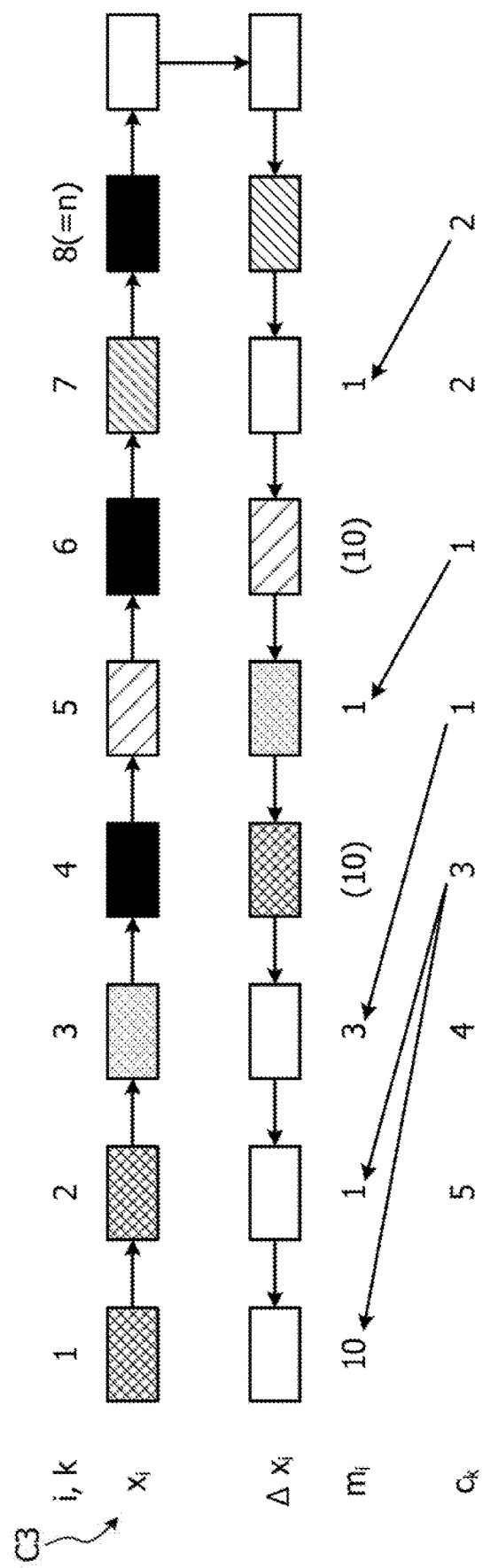
FIG. 10C is an explanatory diagram that explains one example of prefetch.

FIG. 10A to FIG. 10C are explanatory diagrams that explain one example of prefetch. Hatched rectangles in FIG. 10A to FIG. 10C represent the correspondence relationship between the layer at which the BWD is started and the layer for which the neuron (x) is prefetched at the time of start of the BWD. Furthermore, a black rectangle represents data excluded from the memory saving target (loaded in advance to be held on the memory 60).

As illustrated in FIG. 10A, in a case C1, transfer time (1) is hidden by calculation time (2) in all layers. Therefore, in the case C1, the prefetch is carried out at the previous layer of each layer.

As illustrated in FIG. 10B, in a case C2, calculation time (1) is shorter than transfer time (2) and the transfer time is not hidden by the calculation time by the prefetch at the previous layer of each layer. In this case, the information processing apparatus 10 increases the value of k to the layer with which the total calculation time matches the transfer time ($m_i$). Furthermore, the prefetch of $x_3$ is started at the time of start of $c_7$, and the prefetch of $x_2$ is started at the time of start of $c_5$, and the prefetch of $x_1$ is started at the time of start of $c_3$. The layers for which the completion of the prefetch is difficult ($x_4$, $x_5$, $x_7$) are regarded as what is excluded from the memory saving target.

As illustrated in FIG. 10C, a case C3 is one example of the case in which layers regarding which the transfer layer is not hidden exist in the middle. In such a case C3, the information processing apparatus 10 regards the layers regarding which the transfer layer is not hidden even when the value of k is increased ($x_4$, $x_6$) as what is excluded from the memory saving target, and carries out the prefetch at the next layer and the subsequent layers.

Figure 11A:
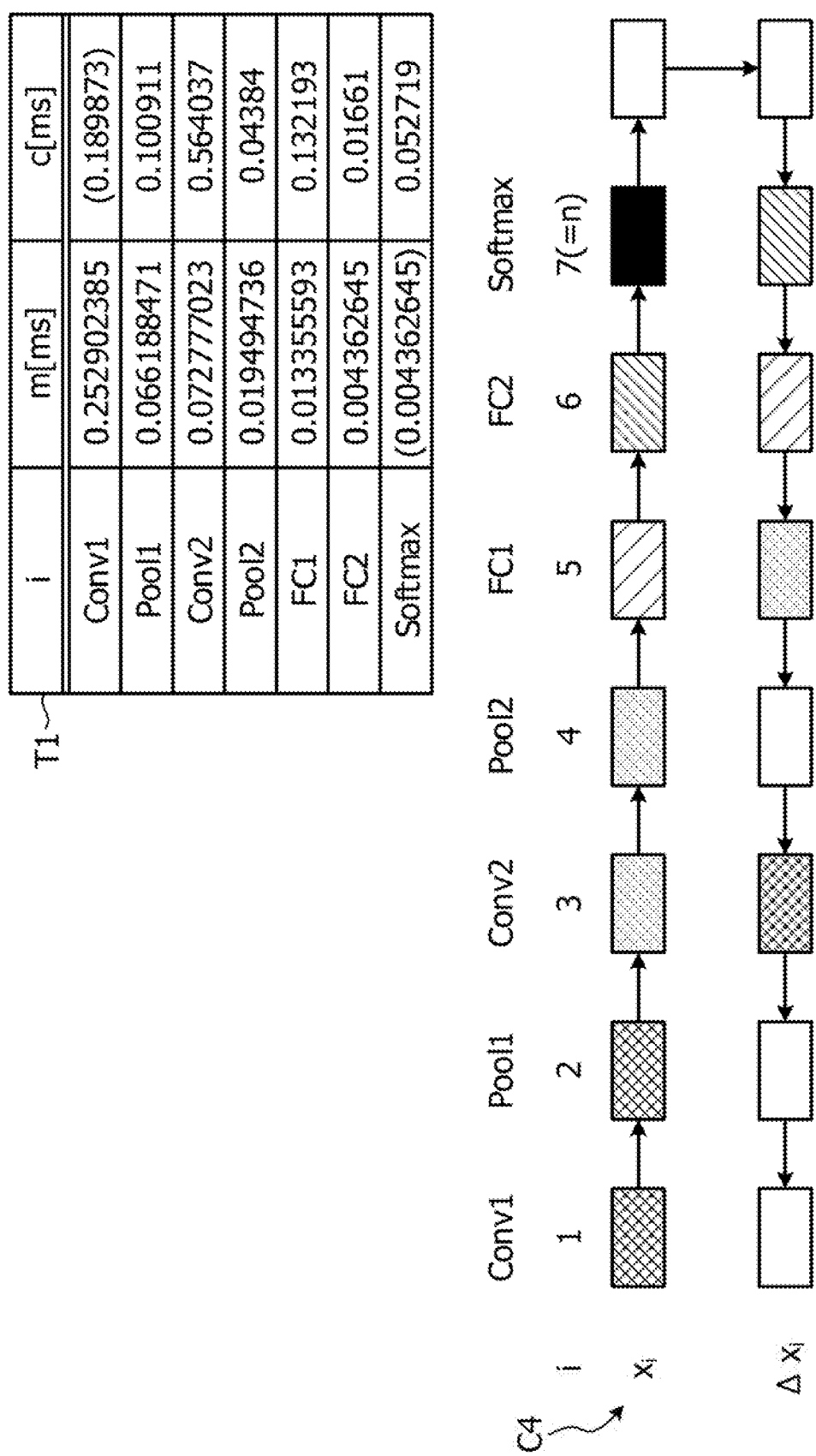
FIG. 11A is an explanatory diagram that explains one example of simulation with use of estimated values.
Figure 11B:
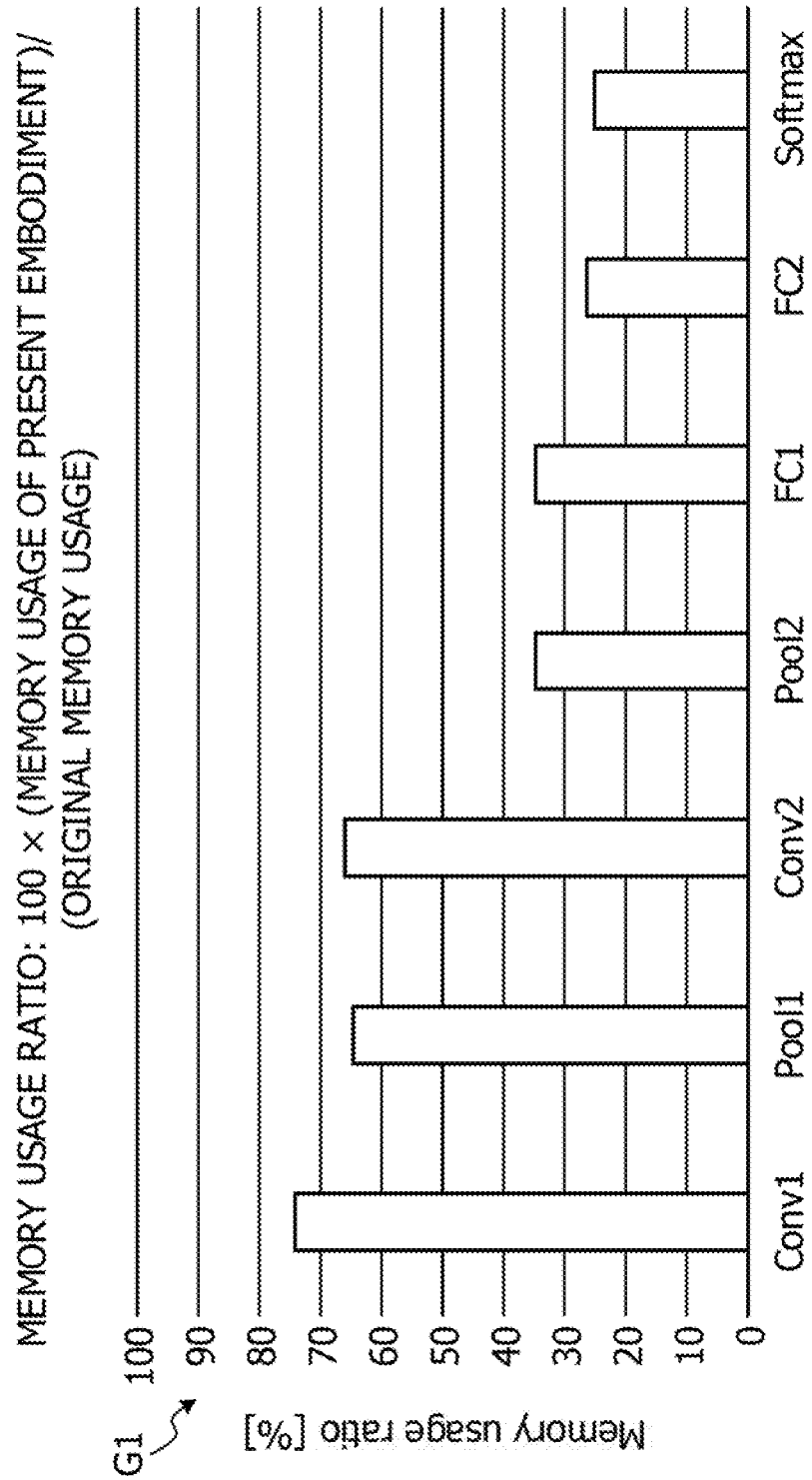
FIG. 11B is an explanatory diagram that explains one example of simulation with use of estimated values.

FIG. 11A and FIG. 11B are explanatory diagrams that explain one example of simulation with use of estimated values. As illustrated in FIG. 11A, the transfer time (m) and the calculation time (c) of each layer are as represented in table T1. As a result, as in a case C4, the neuron (x) is prefetched, with the transfer time hidden by the calculation time, at all layers other than the final layer. Therefore, reduction in the memory usage of the accelerator board 22 may be implemented while the arising of a waiting time due to data transfer is suppressed.

For example, as represented in a graph G1 in FIG. 11B, memory usage is reduced by 25.5% (memory usage is reduced by 53.2% on average) at the time of the maximum use of the memory (at the time of execution of BWD of Conv1). Although a DNN of eight layers is used in this simulation, normally a DNN of approximately 15 layers to 150 layers is used. Therefore, it is expected that the reduction rate further increases in the DNN of approximately 15 layers to 150 layers.

As described above, the overall control unit 50 of the information processing apparatus 10 decides the timing when data relating to calculation of the first layer is stored in the memory 60 based on the calculation time estimated in advance regarding each layer of the neural network and the time of transfer of data relating to calculation of each layer to the memory 60. For example, the overall control unit 50 decides the timing when transfer to the memory 60 is completed in the total time of the calculation time at one or plural second layers at which calculation is carried out earlier than the first layer. Then, the overall control unit 50 stores the data relating to calculation of the first layer in the memory 60 based on the decided timing.

Due to this, in the information processing apparatus 10, the data relating to calculation of the first layer is stored in the memory 60 in the calculation time at the one or plural second layers. For example, the time of transfer of the data relating to calculation of the first layer is hidden by the calculation time at the one or plural second layers at which calculation is carried out earlier than the first layer. Therefore, the information processing apparatus 10 may reduce the usage of the memory 60 in the accelerator board 22 through saving data to the host side while suppressing the arising of a waiting time due to data transfer.

Furthermore, the overall control unit 50 compares the total time of the calculation time at the one or plural second layers and the time of transfer of the data relating to calculation of the first layer sequentially from the layer at which calculation is carried out latest with respect to the first layer. Subsequently, the overall control unit 50 decides the timing of start of calculation of the layer with which the time of transfer is shorter than the total time of the calculation time as the timing when the data relating to calculation of the first layer is stored in the memory 60.

Due to this, the information processing apparatus 10 stores the data relating to calculation of the first layer in the memory 60 from the time of start of calculation of the latest layer that allows hiding of the time of transfer of data by the calculation time and thus may efficiently use the memory 60.

Moreover, the overall control unit 50 stores the data relating to calculation of the first layer in the memory 60 prior to calculation of each layer of the neural network when the layer with which the time of transfer is shorter than the total time of the calculation time is not found in the comparison of the total time of the calculation time at the one or plural second layers and the time of transfer of data relating to calculation of the first layer.

This allows the information processing apparatus 10 to suppress the arising of a waiting time due to data transfer more certainly. For example, if the number of layers at which calculation is carried out earlier than the first layer is small, the time of transfer of data is longer than the calculation time in some cases. In such a case, because the information processing apparatus 10 stores the data relating to calculation of the first layer in the memory 60 prior to calculation of each layer of the neural network, the arising of a waiting time due to data transfer at the time of calculation may be suppressed.

In the above-described embodiment, the case of identifying an identification target captured in an image by the neural network is exemplified. However, the configuration is not limited thereto. The identification target may be any as long as it is what is regarded as the identification target by the neural network, such as sound.

Furthermore, in the above-described embodiment, the case in which a CNN is used as a neural network is exemplified. However, the configuration is not limited thereto. For example, the neural network may be a neural network that may learn and recognize a time series, such as a recurrent neural network (RNN). The RNN is an extension of the CNN and carries out the backpropagation as with the CNN. Thus, the processing similar to that of the present embodiment may be applied.

Moreover, in the above-described embodiment, the case in which the recognition processing and the learning processing are executed by one information processing apparatus 10 is exemplified. However, the configuration is not limited thereto. For example, the configuration may be made as an information processing system that executes the recognition processing and the learning processing by plural information processing apparatuses 10. For example, in the case of processing input neuron data by a mini-batch method, the input neuron data may be processed as follows. For example, the information processing system may divide the input neuron data into every M items and execute the recognition processing and the learning processing by different information processing apparatuses 10 to collect the errors of the parameters figured out by each of the information processing apparatuses 10 and update the parameters.

Furthermore, in the above-described embodiment, the case in which the memory amount calculating unit 51 is set in the arithmetic operation unit 31 of the motherboard 21 is exemplified. However, the configuration is not limited thereto. For example, the memory amount calculating unit 51 may be set in the arithmetic operation unit 61 of the accelerator board 22. Furthermore, the memory amount calculating unit 51 of the arithmetic operation unit 61 of the accelerator board 22 may figure out the amount of memory used for storing of the neuron data and the parameters at each layer of the neural network.

Moreover, in the above-described embodiment, the case is exemplified in which the amount of memory used in the recognition processing and the learning processing is calculated before start of the recognition processing. However, the configuration is not limited thereto. For example, the amount of memory used in the recognition processing may be calculated before start of the recognition processing and, after the end of the recognition processing, the amount of memory used in the learning processing may be calculated before start of the learning processing.

Furthermore, the respective constituent elements of the respective apparatuses that are diagrammatically represented are functionally conceptual and may not be necessarily have to be configured as diagrammatically represented physically. For example, specific states of distribution and integration of the respective apparatuses are not limited to the diagrammatically-represented states, and all or part of the respective apparatuses may be configured to be distributed or integrated functionally or physically in an arbitrary unit according to various loads, the status of use, and so forth. For example, the respective processing units of the overall control unit 50, the memory amount calculating unit 51, the recognition control unit 70, and the learning control unit 71 may be integrated as appropriate. Furthermore, processing of each processing unit may be split into processing of plural processing units as appropriate. Moreover, all or an arbitrary part of the respective processing functions carried out in the respective processing units may be implemented by a CPU and a program analyzed and executed in this CPU or be implemented as hardware based on wired logic.

[Information Processing Program]

Figure 12:
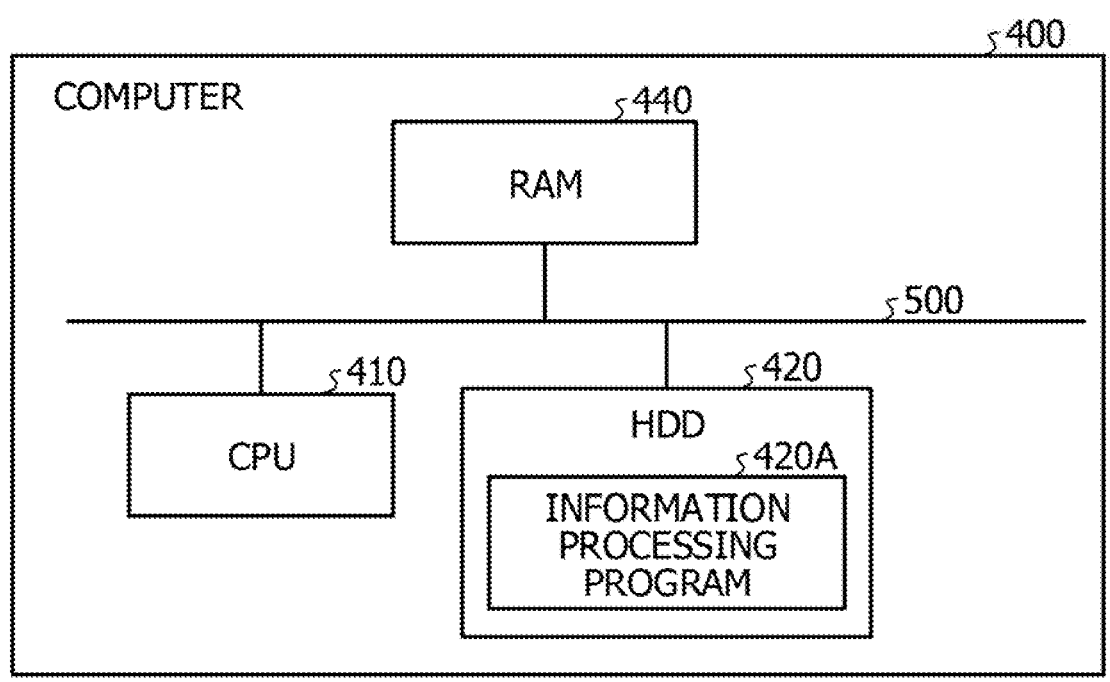
FIG. 12 illustrates one example of a configuration of a computer that executes an information processing program.

Furthermore, it is also possible to implement various kinds of processing explained in the above-described embodiment by executing a program prepared in advance by a computer system such as a personal computer or work station. Thus, in the following, one example of a computer system that executes an information processing program will be described. FIG. 12 is a diagram illustrating one example of a configuration of a computer that executes an information processing program.

As illustrated in FIG. 12, a computer 400 includes a CPU 410, a hard disk drive (HDD) 420, and a random access memory (RAM) 440. These respective units of 400 to 440 are coupled via a bus 500.

An information processing program 420A that exerts the functions similar to those of the above-described overall control unit 50, memory amount calculating unit 51, recognition control unit 70, and learning control unit 71 is stored in the HDD 420 in advance. The information processing program 420A may be split as appropriate.

Furthermore, the HDD 420 stores various kinds of information. For example, the HDD 420 stores OS, various programs, and various kinds of information similarly to the storing unit 20.

Moreover, the CPU 410 causes operation of a process to execute the respective processing units of the above-described embodiment by reading out the information processing program 420A from the HDD 420 and executing it. For example, this process carries out the operation similar to that of the overall control unit 50, the memory amount calculating unit 51, the recognition control unit 70, and the learning control unit 71.

The above-described information processing program 420A may be stored in "portable physical media" such as flexible disc (FD), compact disc (CD)-ROM, digital versatile disc (DVD) disc, magneto-optical disc, and integrated circuit (IC) card inserted in the computer 400, for example. Furthermore, the computer 400 may read out the information processing program 420A from them and execute it.

Moreover, the information processing program 420A is stored in "other computers (or servers)" or the like coupled to the computer 400 through a public line, the Internet, a local area network (LAN), a wide area network (WAN), or the like. Furthermore, the computer 400 may read out the information processing program 420A from them and execute it.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus configured to be coupled to a storage device, the information processing apparatus comprising:
    a memory; and
    a processor coupled to the memory, the processor being configured to perform processing including:
    obtaining, by a processor circuit of the information processing apparatus, a first estimated time and a second estimated time, the first estimated time being an estimated time required for transferring data from the storage device to a first layer among a plurality of layers of a neural network, the second estimated time being an estimated time required for performing a calculation in a second layer among the plurality of layers, the first layer being a layer among the plurality of layers, the second layer being among the plurality of layers a layer before the first layer;
    obtaining, by the processor circuit of the information processing apparatus, a determination result by determining whether the first estimated time is less than the second estimated time;

in response to the determination result indicating that the first estimated time is less than the second estimated time, deciding, by the processor circuit of the information processing apparatus, a timing of the transferring the data from the storage device to the first layer so that the transferring of the data from the storage device to the first layer is initiated on or after a start time of the calculation in the second layer and is completed by an end time of the calculation in the second layer; and in response to detecting of amounting to the decided timing in sequentially performing calculation in each of the plurality layers of the neural network, initiating, by the processor circuit of the information processing apparatus, transferring of the data from the storage device to the memory in order to use the data to perform calculation in the first layer.

2. The information processing apparatus according to claim 1, the processing further including:

comparing the total time of the calculation time at the one or plurality of second layers and the time of transfer of the data relating to calculation of the first layer sequentially from a layer at which calculation is carried out latest with respect to the first layer, and deciding a timing of start of calculation of a layer with which the time of transfer is shorter than the total time of the calculation time as the timing when the data relating to calculation of the first layer is stored in the memory.

3. The information processing apparatus according to claim 2, the processing further including storing the data relating to calculation of the first layer in the memory prior to the calculation of each layer of the neural network when the layer with which the time of transfer is shorter than the total time of the calculation time is not found in the comparison.

4. The information processing apparatus according to claim 1, wherein the calculation is calculation relating to backward processing.

5. The information processing apparatus according to claim 1, wherein the data is a neuron error or a parameter error.

6. An information processing method implemented by a computer configured to be coupled to a storage device, the method comprising:

obtaining, by the processor circuit of the computer, a first estimated time and a second estimated time, the first estimated time being an estimated time required for transferring data from the storage device to a first layer among a plurality of layers of a neural network, the second estimated time being an estimated time required for performing a calculation in a second layer among the plurality of layers, the first layer being a layer among the plurality of layers, the second layer being among the plurality of layers a layer before the first layer;

obtaining, by the processor circuit of the computer, a determination result by determining whether the first estimated time is less than the second estimated time;

in response to the determination result indicating that the first estimated time is less than the second estimated time, deciding, by the processor circuit of the computer, a timing of the transferring the data from the storage device to the first layer so that the transferring of the data from the storage device to the first layer is initiated on or after a start time of the calculation in the second layer and is completed by an end time of the calculation in the second layer; and in response to detecting of amounting to the decided timing in sequentially performing calculation in each of the plurality layers of the neural network, initiating, by the processor circuit of the computer, transferring of the data from the storage device to the memory in order to use the data to perform calculation in the first layer.

7. A non-transitory computer-readable storage medium for storing a program which causes a computer configured to be coupled to a storage device to perform processing, the processing comprising:

obtaining, by a processor circuit of the computer, a first estimated time and a second estimated time, the first estimated time being an estimated time required for transferring data from the storage device to a first layer among a plurality of layers of a neural network, the second estimated time being an estimated time required for performing a calculation in a second layer among the plurality of layers, the first layer being a layer among the plurality of layers, the second layer being among the plurality of layers a layer before the first layer;

obtaining, by the processor circuit of the computer, a determination result by determining whether the first estimated time is less than the second estimated time;

in response to the determination result indicating that the first estimated time is less than the second estimated time, deciding, by the processor circuit of the computer, a timing of the transferring the data from the storage device to the first layer so that the transferring of the data from the storage device to the first layer is initiated on or after a start time of the calculation in the second layer and is completed by an end time of the calculation in the second layer; and in response to detecting of amounting to the decided timing in sequentially performing calculation in each of the plurality layers of the neural network, initiating, by the processor circuit of the computer, transferring of the data from the storage device to the memory in order to use the data to perform calculation in the first layer.

* * * * *